United States Patent
Kaneko et al.

(10) Patent No.: US 6,933,633 B2
(45) Date of Patent: Aug. 23, 2005

(54) ROTATING ELECTRIC MACHINE AND COOLING STRUCTURE FOR ROTATING ELECTRIC MACHINE

(75) Inventors: Yutaro Kaneko, Yokohama (JP); Shinichiro Kitada, Tokyo (JP); Toshio Kikuchi, Yokosuka (JP); Takashi Tsuneyoshi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 343 days.

(21) Appl. No.: 10/227,920

(22) Filed: Aug. 27, 2002

(65) Prior Publication Data

US 2003/0062780 A1 Apr. 3, 2003

(30) Foreign Application Priority Data

Oct. 3, 2001 (JP) ........................................ 2001-307128
Oct. 10, 2001 (JP) ........................................ 2001-312258
Oct. 15, 2001 (JP) ........................................ 2001-316292

(51) Int. Cl.$^7$ ................................................. H02K 9/00
(52) U.S. Cl. ................................. 310/52; 310/54
(58) Field of Search .......................... 310/52, 54, 58, 310/64

(56) References Cited

U.S. PATENT DOCUMENTS 3,675,056 A * 7/1972 Lenz ........................... 310/54
3,684,906 A * 8/1972 Lenz ........................... 310/61
4,227,108 A * 10/1980 Washizu et al. .............. 310/214
4,912,350 A * 3/1990 Parshall et al. .............. 310/217
5,084,642 A * 1/1992 Katsuzawa et al. ........... 310/54
5,365,132 A * 11/1994 Hann et al. .................... 310/58
6,680,550 B2 * 1/2004 Matsunaga et al. ........... 310/58
6,713,927 B2 * 3/2004 Kikuchi et al. .............. 310/214

FOREIGN PATENT DOCUMENTS

| JP | 4-364343 | 12/1992 |
| JP | 5-236705 | 9/1993 |
| JP | 7-322565 | 12/1995 |
| JP | 11-069721 | 3/1999 |

* cited by examiner

Primary Examiner—Darren Schuberg
Assistant Examiner—Nguyen Hanh
(74) Attorney, Agent, or Firm—Foley & Lardner LLP

(57) ABSTRACT

A cooling structure and a rotating electric machine with the cooling structure are provided. The cooling structure produces sufficient reductions in the temperature of the stator core while at the same time not causing a large reduction in the output of the rotating electric machine. The rotating electric machine is provided with a first cooling medium passage formed in the slot. In addition, a second cooling medium passage is provided which extends in parallel to the first cooling medium passage and allows flow of the same cooling medium as the first cooling medium passage. The stator core comprises at least a section of the passage wall of the second cooling medium passage. The second cooling medium passage is disposed so that the second cooling medium passage does not impede the flow of magnetic flux in the stator core.

32 Claims, 25 Drawing Sheets

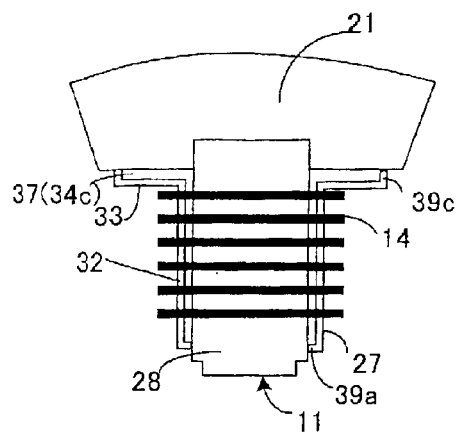
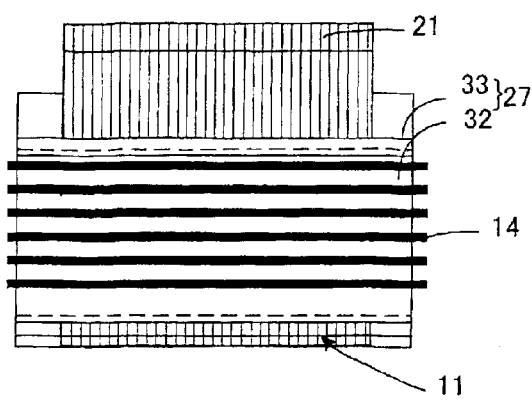
FIG.26A  FIG.26B
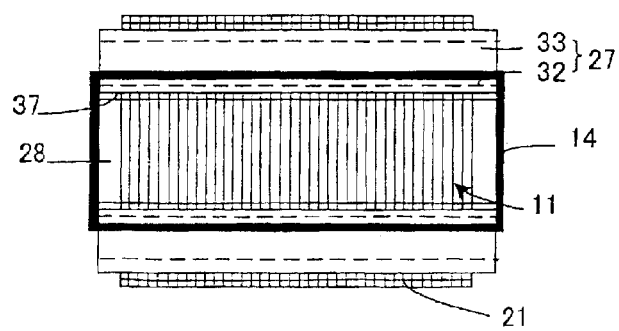
FIG.26C

ROTATING ELECTRIC MACHINE AND COOLING STRUCTURE FOR ROTATING ELECTRIC MACHINE

FIELD OF THE INVENTION

This invention relates to a rotating electric machine and a cooling device for a rotating electric machine.

BACKGROUND OF THE INVENTION

In a rotating electric machine functioning as a motor, or a generator or a motor/generator, it is preferred that the stator core and the rotor are cooled in order prevent generation of heat.

Tokkai Hei 5-236705 published by the Japanese Patent Office in 1992, Tokkai Hei 7-322565 published by the Japanese Patent Office in 1995 and Tokkai Hei 11-69721 published by the Japanese Patent Office in 1999 disclose a rotating electric machine provided with a passage for a cooling medium in a stator core.

The cooling of the stator core allows the indirect cooling of the rotor. Therefore when the stator core is sufficiently cooled, it is not necessary to provide a cooling structure for the rotor. However when a passage for the cooling medium is formed in the stator core, it is sometimes the case that the passage for the cooling medium hinders the flow of magnetic flux and reduces the output of the rotating electric machine. In the prior-art techniques referred to above, the passage for the cooling medium is disposed without taking into account any adverse effect the passage for cooling medium may have on the flow of magnetic flux.

On the other hand, Tokkai Hei 4-364343 published by the Japanese Patent Office in 1992 discloses a cooling structure using a space in a slot as a passage for a cooling medium such as oil. The passage for cooling medium is formed by sealing the opening of a stator slot with a resin layer. In this manner, the flow of magnetic flux is not impeded by the passage for the cooling medium in contrast to forming the passage for the cooling medium in the stator core. Consequently there is no reduction in the output of the rotating electric machine. However in this type of cooling structure, since the coils are wound on the teeth of the stator core, the area of contact of the cooling medium with the stator core is small and the cooling passage is not provided in direct contact with the stator core. Therefore it is difficult for this type of cooling structure to realize sufficient reductions in the temperature of the stator core.

SUMMARY OF THE INVENTION

It is therefore an object of this invention to provide a cooling structure which does not cause a large reduction in the output of a rotating electric machine and which at the same time realizes sufficient reductions in the temperature of a stator core. It is a further object of this invention to provide a rotating electric machine adapted for use with this cooling structure.

In order to achieve above objects, this invention provides a rotating electric machine comprising a rotor; a substantially cylindrical stator core having teeth and a back core from which the teeth project; stator coils wound on the periphery of the teeth of the stator core; a slot formed between two adjacent teeth; a first cooling medium passage extending along the axial direction of the stator core, the first cooling medium passage formed in the slot and between two adjacent stator coils by sealing the slot opening facing the rotor; and a second cooling medium passage extending in parallel to the first cooling medium passage, wherein the stator core forms at least a section of the passage wall of the second cooling medium passage; and the second cooling medium passage is disposed so that the second cooling medium passage does not largely impede the flow of magnetic flux in the stator core.

The details as well as other features and advantages of this invention are set forth in the remainder of the specification and are shown in the accompanying drawings.

BRIEF DESCRIPTION OF THE DRAWINGS

FIG. 24 is a partially enlarged view of a stator core according to a first example in the third embodiment wherein FIG. 24A is an end view, FIG. 24B is a side view.

FIG. 25 is a partially enlarged view of a stator core according to a second example in the third embodiment wherein

FIG. 26 is a partially enlarged view of a stator core according to a third example in the third embodiment wherein FIG. 26A is an end view, FIG. 26B is a side view, and FIG. 26C is a front view.

FIG. 27 shows an insulating side plate according to a fourth example in the third embodiment wherein

FIG. 28 is a partially enlarged view of a stator core according to a fifth example in the third embodiment wherein

FIG. 29 is a partially enlarged view of a stator core according to a fifth example in the third embodiment wherein

FIG. 30 is a partially enlarged view of a stator core according to a seventh example in the third embodiment wherein

FIG. 31 is a partially enlarged view of a stator core according to an eighth example in the third embodiment wherein

DESCRIPTION OF THE PREFERRED EMBODIMENTS

In order to describe the invention in greater detail, a first embodiment of the invention will be outlined below with reference to FIG. 1 to FIG. 9.

Figure 1:
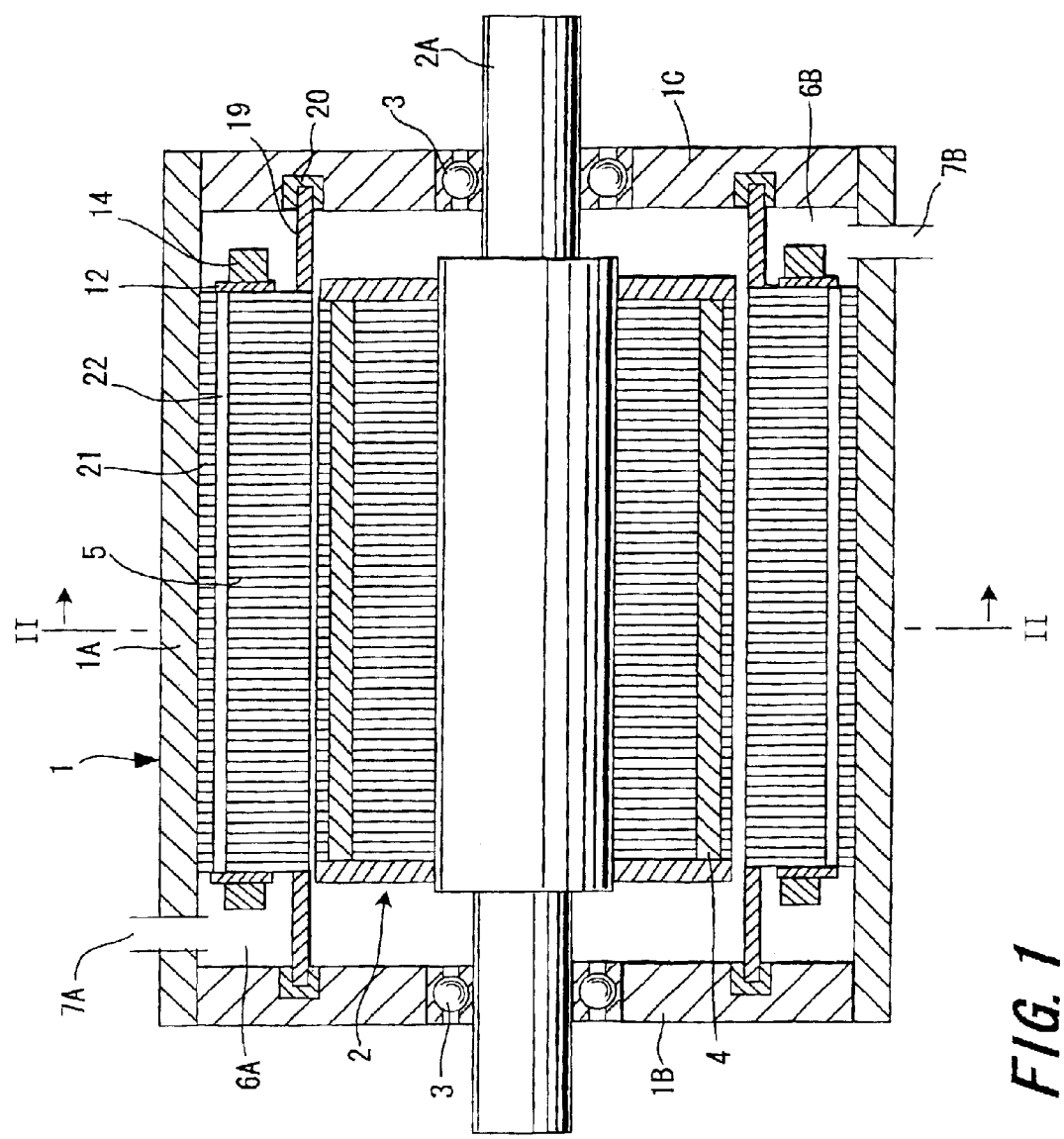
FIG. 1 is a cross sectional view along an axial direction of a rotating electrical machine provided with a cooling mechanism according to a first embodiment of this invention.
Figure 2:
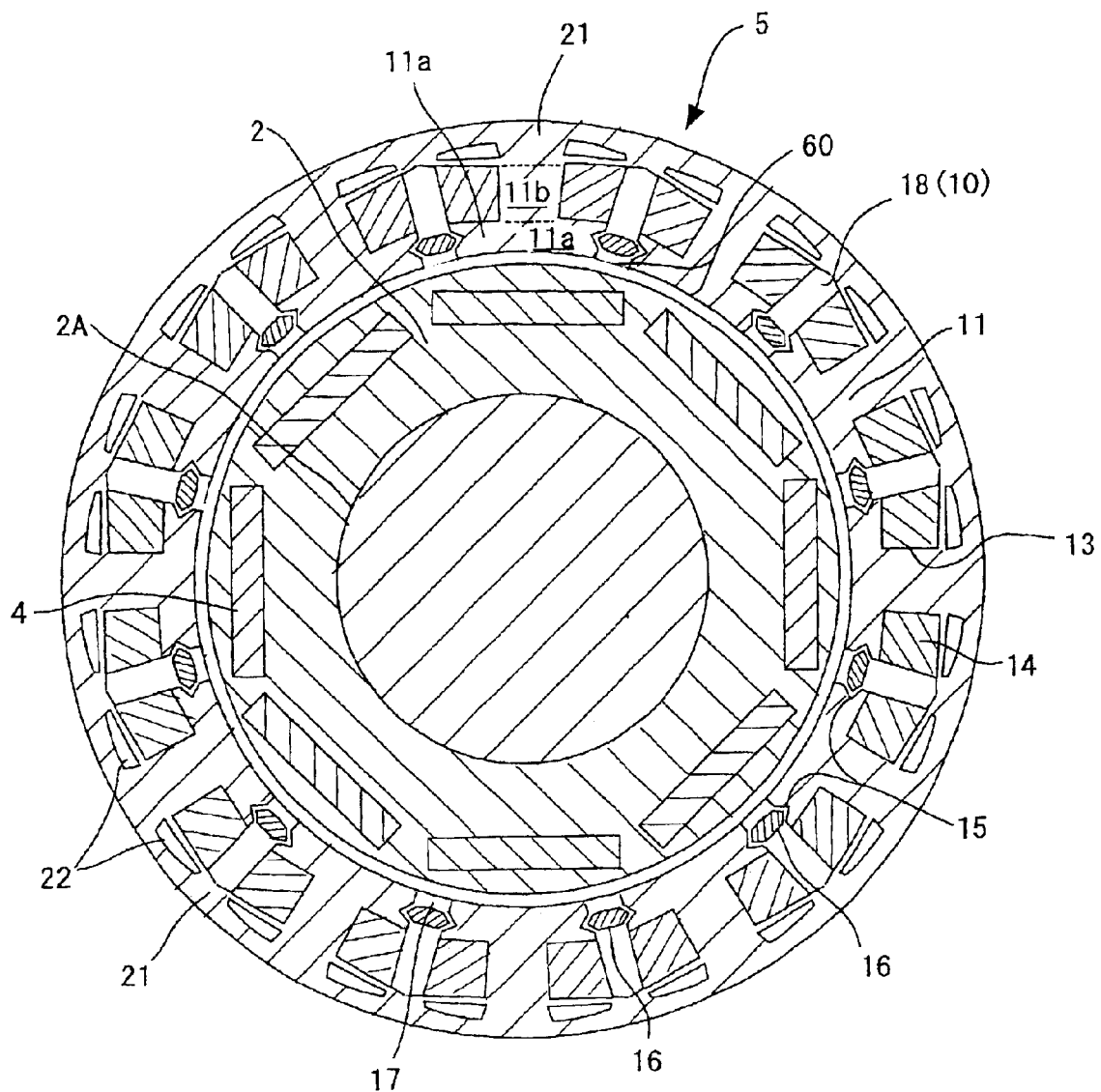
FIG. 2 is a cross sectional view orthogonal to an axial direction of a rotating electrical machine provided with a cooling mechanism according to the first embodiment of this invention. This cross sectional view is taken along II—II line of FIG. 1.

Referring to FIG. 1 and FIG. 2, the overall structure of the rotating electric machine will be described. This rotating electric machine may be an electric motor, a generator or a motor/generator. In the embodiments described hereafter, the rotating electric machine is a synchronous motor having permanent magnets. However this invention is not limited in this regard and the rotating electric machine may be an induction motor, a SR motor and another type of motor.

Referring to FIG. 1, a case 1 for an electric motor comprises a cylindrical plate 1A, and side plates 1B, 1C sealing the opening on both ends of the cylindrical plate 1A. A cylindrical rotor 2 is stored in the case 1. The rotation shaft 2A of the rotor 2 is supported by a bearing 3 on the side plates 1B, 1C of the case 1 and the rotor 2 rotates freely about the rotation shaft 2A.

Referring to FIG. 2, the rotor 2 stores a plurality of permanent magnets 4 at equiangular intervals so that the poles of adjacent permanent magnets 4 are opposed. The number of poles of the rotor 2 is eight, however the invention is not limited in this regard.

A substantially cylindrical stator core 5 is disposed on the inner peripheral face of the cylinder plate 1A of the case 1 so as to encircle the outer periphery of the rotor 2. The stator core 5 is formed in one piece. However the stator core 5 may be divided along a circumferential direction into a plurality of sections containing teeth. The stator core 5 is provided with a substantially annular back core 21 which is the outer peripheral section of the stator core 5, and teeth 11 project from the back core 21 of the stator core 5. The teeth 11 comprise tips 11a facing the rotor 2 and rectangular parallelepiped trunks 11b (namely, main section) provided between the tip 11a and the back core 21. Coils are wound on the trunks 11b of the stator core 5. A space is provided between the outer peripheral face of the rotor 2 and the cylindrical inner face 60 of the stator core 5. The stator core 5 is provided with a plurality of slots 10 opening towards the cylindrical inner face 60 of the stator core 5. The slots 10 are formed between adjacent teeth 11 and parallel to the axial direction of the stator core 5, that is to say parallel to the rotation shaft 2A. A plate-shaped insulating body 12 is disposed on both end faces of each of the teeth 11. The stator coils 14 are wound by concentrated windings onto the teeth 11 with insulating paper 13 provided on the inner face of the slot 10. The stator coils 14 are housed in the slot 10. The stator coils 14 are coiled onto the insulating bodies 12 and the coil end of the stator coils 14 expands on both ends of the stator core 5.

An engaging groove 15 which extends axially along the side face of the teeth 11 is formed in proximity to the opening of the slot 10. A plate 16 made from resin is attached to the opposed pair of engaging grooves 15 facing and sandwiching the slot 10. A resin layer 17 is formed on the rotor's side of the plate 16 by molding of a resinous material as described below. The face near to the rotor of the resin layer 17 and the face on the tip of the teeth of the stator core 5 form the cylindrical inner face 60. The slot 10 whose opening is sealed by the plate 16 and the resin layer 17 houses the stator coils 14 and comprises a cooling passage 18 connecting the front end and the rear end of the stator core 5. The cooling passage 18 is referred to as a "first cooling medium passage" hereafter.

A cylindrical section 19 is provided along the cylindrical inner face 60 on the front and rear ends of the stator core 5. The cylindrical section 19 projects from the end and is connected with the inner peripheral face of the stator core 5. The cylindrical section 19 is integrated with the resin layer 17. The end of the cylindrical section 19 is fixed to the side wall 1B, 1C of the case 1 by a rubber seal 20. The cylindrical section 19, the cylindrical plate 1A of the case 1 and the side walls 1B, 1C forms a cooling jacket 6A, 6B on both ends of the stator core 5. The cooling jackets 6A, 6B comprise an annular space which is interconnected through a cooling passage 18. Oil is supplied as a cooling medium through an inlet 7A provided in the cylindrical plate 1A of the case to the cooling jacket 6A. The cooling oil flows through a cooling passage 18 formed in the slot 10 and is introduced into the cooling jacket 6B on the opposite side. This cooling oil is discharged to the outside from the cooling jacket 6B through an oil discharge outlet 7B provided in the cylindrical plate 1A.

The back core 21 connects with the base of the teeth 11 of the stator core 5. A cooling medium passage 22 extending in an axial direction is provided in the back core 21 at a position adjacent to the stator coil 14. The cooling medium passage 22 is referred to as a "second cooling medium passage" hereafter.

Figure 3:
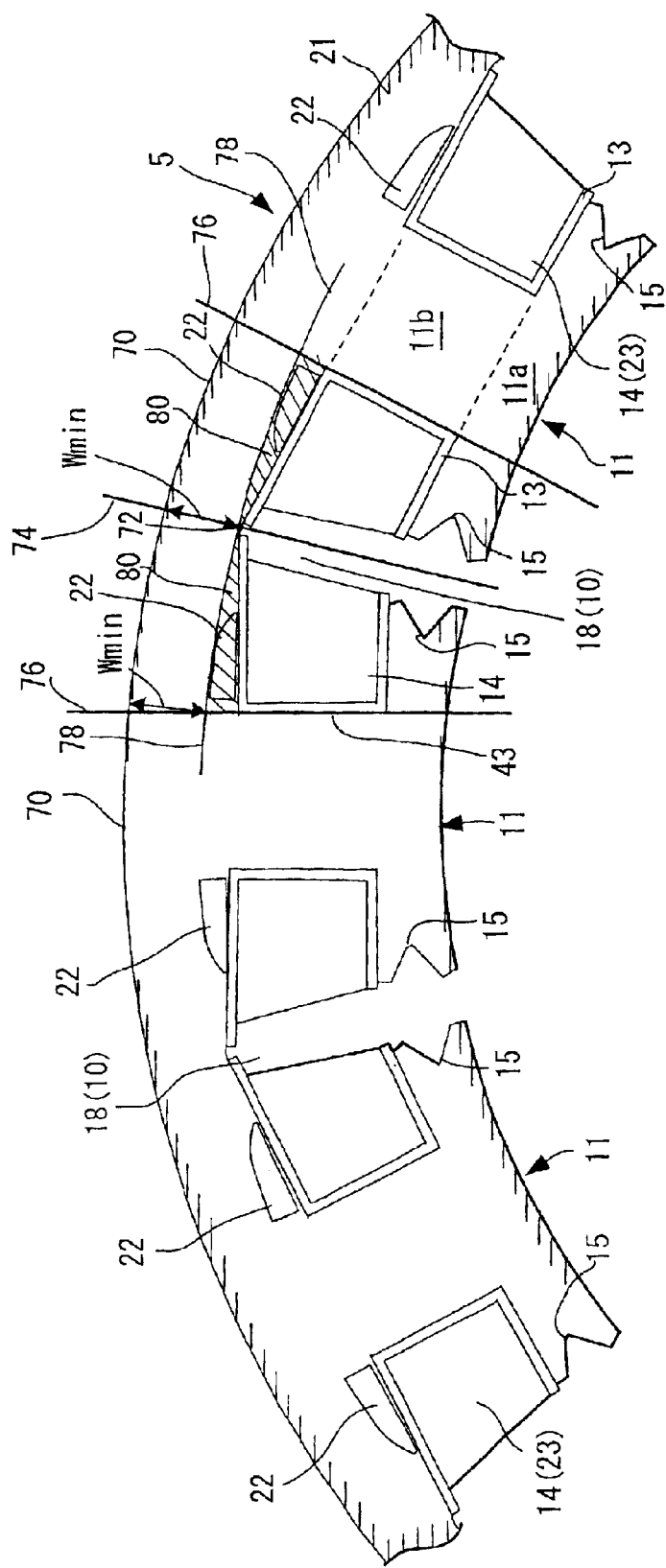
FIG. 3 is a cross sectional view of a stator core showing the range in which a cooling medium passage is disposed according to the first embodiment.

FIG. 3 is a partially enlarged sectional view and shows a vertical cross section to an axial direction of the stator core 5. In order to simplify the description, the cooling medium passage 22 according to the actual example (EXAMPLE 1-I) described hereafter is shown in FIG. 3.

The teeth 11 form a housing 23 for the stator coils 14. The housing 23 is a groove comprising two corners with substantially orthogonal angles. One corner is formed by the trunk 11b and tip 11a of the teeth 11. The other corner is formed by the trunk 11b and the back core 21. After insulating paper 13 is disposed on the wall face of the housing 23 and the insulating body 12 disposed on the end face of the teeth 11, the stator coils 14 are wound with concentrated windings about the trunk 11b of the teeth 11. The stator coils 14 and the teeth 11 of the stator core 5 are electrically insulated by the insulating body 12 and the insulating paper 13. An engagement groove 15 is formed on both sides of the tip 11a of the teeth 11. The plate 16 is disposed with both ends of the plate 16 engaged in the engagement groove 15 and the engagement groove 15 of adjacent teeth 11 thereto. Then the resin layer 17 is filled on the rotor side of the plate 16, thereby enabling the plate 16 to be fixed to the teeth 11. The resin layer 17 forms a cooling passage 18 together with the plate 16 by sealing the opening of the slot 10 as described above. The resin layer 17 is integrated with an annular cylindrical section 19 which extends outwardly away from the end face of the stator core 5.

Referring to FIG. 3, the positioning of the cooling passage 22 will be described in further detail. In order to facilitate the description, FIG. 3 shows a straight line 72 in an axial direction at which the radial distance to the cylindrical outer face 70 of the stator core 5 is equal to a minimum width Wmin of the back core 21, a first plane 74 along the radial direction including the straight line 72, a second plane 76 including the side face 43 of the trunk 11b of the teeth 11, and a cylindrical plane 78 at which the radial distance from the cylindrical outer face 70 of the stator core 5 takes the minimum width Wmin. In this embodiment, the first plane 74 is the central plane of the slot 10. The radius of the cylindrical plane 78 is calculated by subtracting the radius R1 of the cylindrical outer face 70 from the minimum width Wmin of the back core 21 (R1−Wmin). The cooling passage 22 is formed in the region 80 shown by hatching in FIG. 5. This region 80 is a region in the back core 21 defined by the cylindrical face 78 and the second plane 76. The region 80, where the cooling passage 22 is formed, is further provided between the first plane 74 and the second plane 76.

Since the cooling passage 22 is provided in the region 80 in the back core 21, the magnetic flux flowing in the back core 21 of the stator core 5 flows without impediment. This is due to the fact that the radial distance between the surface of the cooling passage 22 and the cylindrical outer face 70 of the stator core 5 is larger than the minimum width Wmin of the flux passage in the back core 21. In this embodiment, the section at which the width of the flux passage takes a minimum value is the central section (which corresponds to the straight line 72) of the surface of the slot 10 between the teeth 11. Consequently the cooling passage 22 is formed in the stator core 5 while avoiding large reductions in the output of the electric motor because the flow of magnetic flux is not impeded.

The cooling oil is supplied to the cooling jacket 6A from the inlet 7A provided in the cylindrical plate 1A of the case 1. The cooling oil in the cooling jacket 6A flows through a cooling passage 18 on the side face of the stator coil 14 of the slot 10 and the cooling medium passage 22 provided in an axial direction in the back core 21, and is transferred to the other cooling jacket 6B. The cooling oil flowing in the cooling passage 18 cools the stator core 5 and the stator coils 14. The cooling oil flowing in the cooling medium passage 22 cools the base of the teeth 11 by direct contact and thereby also ensures cooling of the stator coils 14. In this manner, the tip 11a of the teeth 11 absorbs heat radiated from the surface of the rotor 2 facing the air gap and thus indirectly reduces the temperature of the rotor 2.

The cooling oil in the other cooling jacket 6B flows to a heat exchanger (not shown) from the outlet 7B provided in the cylindrical plate 1A of the case 1. The cooling oil in the cooling jacket 6A, 6B does not leak towards the rotor 2 since the cylindrical section 19 and the rubber seal 20 are provided.

Actual examples according to the first embodiment will be described below.

EXAMPLE 1-I

Figure 4A:
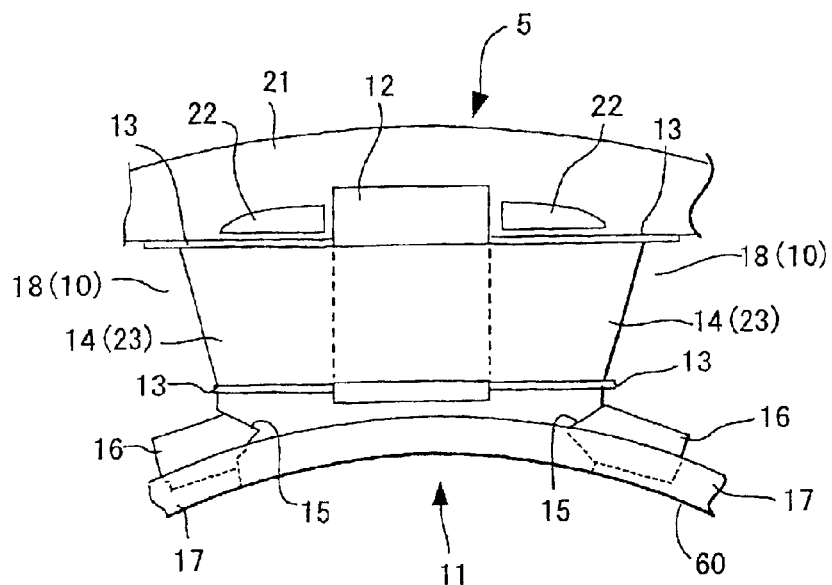
FIG. 4A is a partially enlarged end view of a stator core having a first example of a cooling passage according to the first embodiment.

FIG. 4A is a partially enlarged end view of a stator core 5 including the teeth 11. A single large cooling medium passage 22 is provided in the region 80 in FIG. 3 through the back core 21. Referring to FIG. 4A, the opening of the cooling medium passage 22 is disposed on the outer peripheral side with respect to the stator coil 14. The opening is further disposed on both sides of the insulating body 12 which covers the end face of the teeth 11. As a result, cooling oil in the cooling jacket 6A is introduced into the other cooling jacket 6B through the cooling medium passage 22 and cools the base of the teeth 11.

Figure 4B:
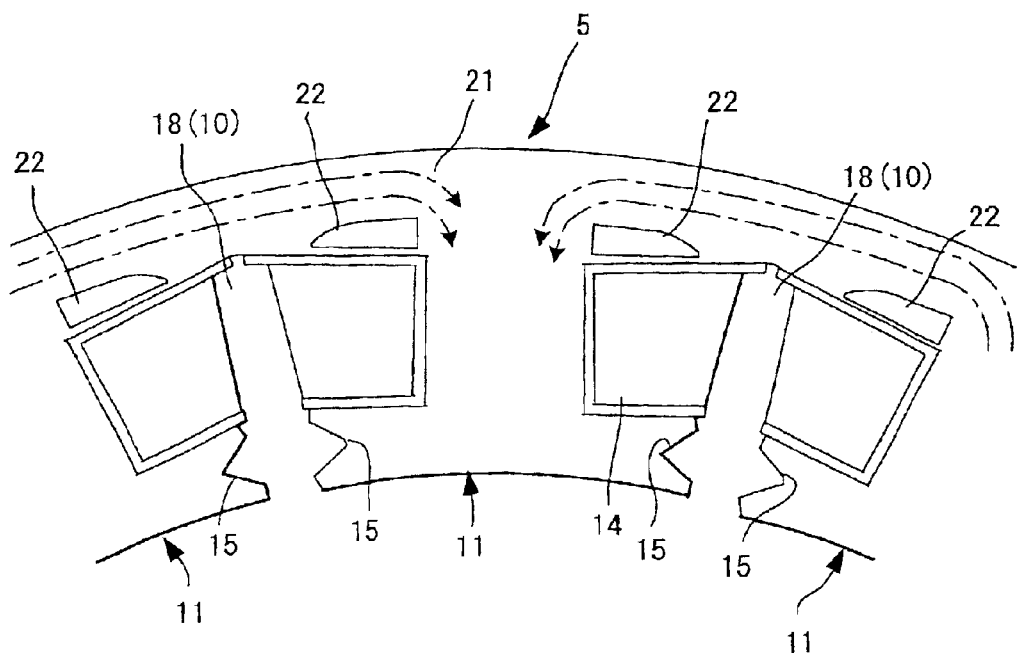
FIG. 4B is an end view of a stator core showing the direction of flow of magnetic flux in the stator core in the first example of a cooling passage according to the first embodiment.

The arrow on the dot-dash line in FIG. 4B shows the direction of flow of the magnetic field. In EXAMPLE 1-I, even when the cooling medium passage 22 is provided on the back core 21, the magnetic flux of the stator core 5 flows smoothly without sharply bending in the back core 21. This is due to the fact that although the width of the flux passage is narrowed as a result of the cooling medium passage 22, it is still larger than the minimum width Wmin of the flux passage in the back core 21. The section of minimum width in the flux passage is the section on the center plane 74 of the slot 10 between the teeth 11. Since the flow of magnetic flux is not impeded, it is possible to avoid reductions in the output of the electric motor.

Figure 5:
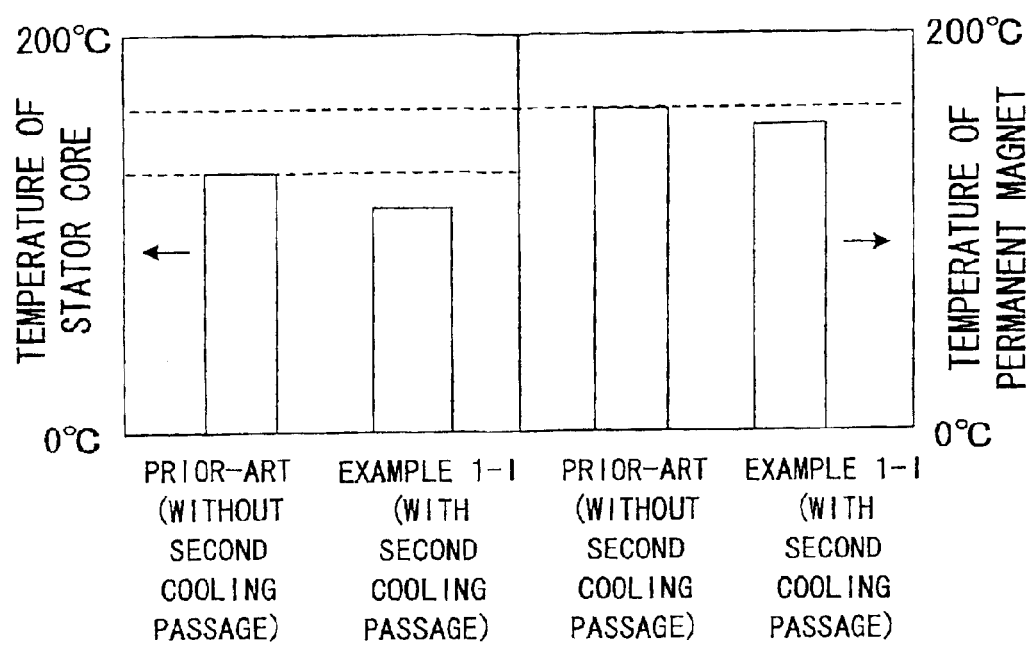
FIG. 5 is a graph showing a comparison of the cooling effect of a conventional example and the cooling effect of a cooling passage according to the first example in the first embodiment.

The graph shown in FIG. 5 shows the temperature during steady-state operation of a synchronous motor with permanent magnets according to EXAMPLE 1-I and a synchronous motor with permanent magnets according to the prior-art example. The difference between the two motors is whether or not a cooling medium passage 22 (second cooling medium passage) is provided. Referring to FIG. 5, in comparison with the prior-art example which is only provided with the cooling passage 18 (first cooling passage), a motor which is provided with a cooling medium passage 22 through the back core 21 of the stator core 5 realizes a reduction both in the temperature of the stator core 5 and in the temperature of the magnets 4 housed on the rotor 2.

Figure 6:
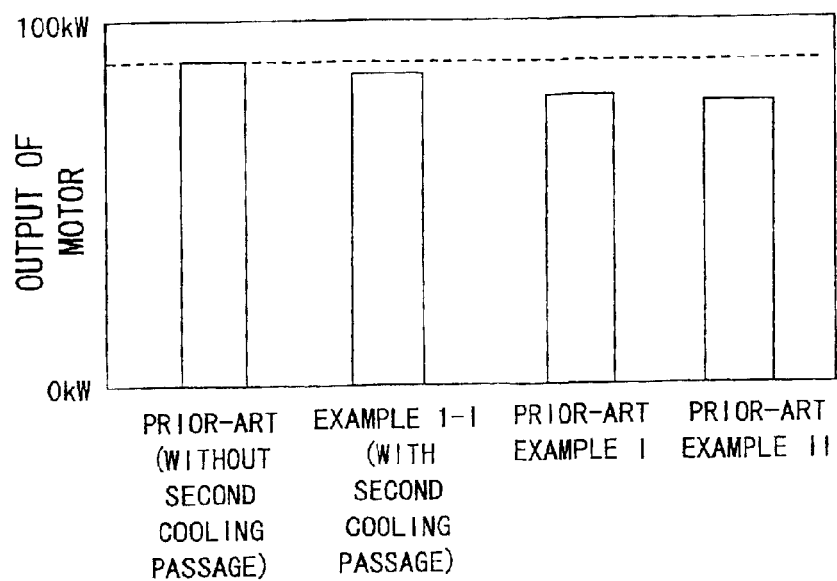
FIG. 6 is a graph showing a comparison of a conventional example and the first example of the cooling passage in the first embodiment with respect to the effect on the output of a motor.

The graph shown in FIG. 6 shows the output of a synchronous motor with permanent magnets according to this invention and the prior-art example. As shown in FIG. 6, the output of a motor provided with a cooling medium passage 22 through the back core 21 displays only a slight reduction relative to a motor which is not provided with the cooling medium passage 22. Furthermore the output of the motor shown in EXAMPLE 1-I is not considerably lower than the output of the motor in prior-art example I disclosed in Tokkai Hei 5-236705 or the output of the motor in prior-art example II disclosed in Tokkai Hei 11-69721. Since the passage for cooling medium is provided in proximity to the outer periphery of the back core 21 in prior-art examples I, II, in contrast to a motor according to this embodiment, the passage for cooling medium impedes the flow of magnetic flux.

EXAMPLE 1-II

Figure 7:
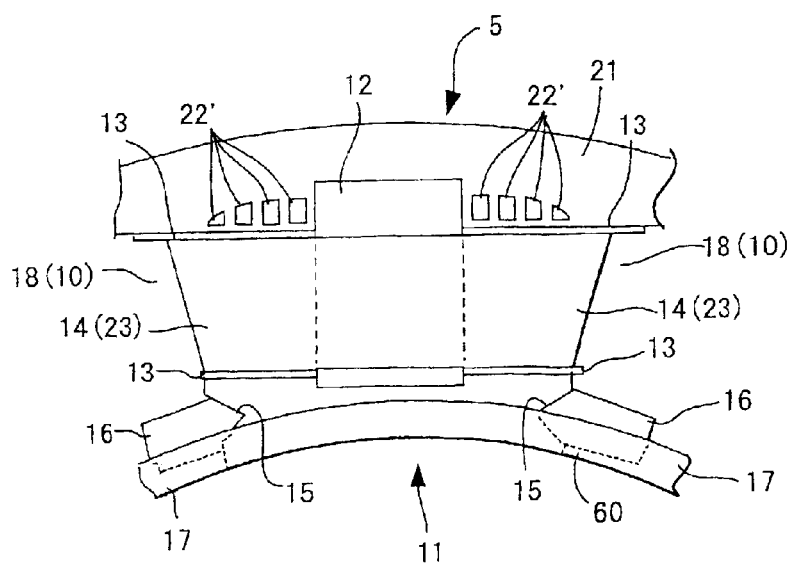
FIG. 7 is a partially enlarged end view of a stator core having a second example of a cooling passage according to the first embodiment.

FIG. 7 is a partially enlarged end view of a stator core 5 provided with a cooling medium passage 22 according to EXAMPLE 1-II.

Referring to FIG. 7, a plurality of cooling medium passages 22' are disposed in region 80 of the stator core 5 as shown in FIG. 3. The cooling medium passage 22 as described with reference to EXAMPLE 1-II is divided into a plurality of cooling medium passages 22'. In comparison to a single large cooling medium passage 22, the formation of a plurality of cooling medium passages 22' increases the mechanical strength of the back core 21. Consequently deformation of the back core 21 can be avoided. Although the total cross-sectional area of the passage of the cooling medium does not increase, the contact area of the cooling oil and stator core 5 is increased, thereby improving cooling performance of the teeth 11 in comparison to EXAMPLE 1-I. Consequently it is possible to further improve cooling performance of the stator core 5 of the rotating electric machine. Furthermore it is possible to further improve cooling performance of the rotating electric machine since indirect cooling of the rotor 2 is increased due to the increase in the amount of heat absorbed by the tips of the teeth 11.

EXAMPLE 1-III

Figure 8:
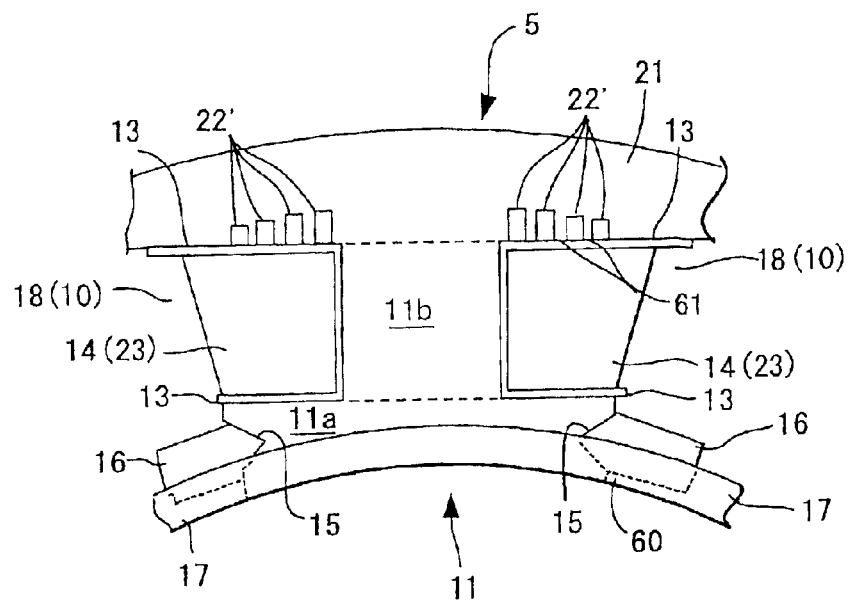
FIG. 8 is a partially enlarged end view of a stator core having a third example of a cooling passage according to the first embodiment.

FIG. 8 is a partially enlarged end view of a stator core 5 provided with a cooling medium passage 22 according to EXAMPLE 1-III. In FIG. 8, the coil end of the stator coil 14 and the insulating body 12 are omitted.

In FIG. 8, a plurality of cooling medium passages 22' are disposed in region 80 shown in FIG. 3. The cooling medium passages 22' comprise a plurality of grooves opening onto the wall face of the housing 23 of the stator coil 14 of the slot 10. The rear face of the insulating paper 13 is retained on the wall 61 between the plurality of grooves during winding operations of the stator coils 14. Thus winding operations for the stator coils 14 can be performed in the same manner as when a cooling medium passage 22' does not open onto the housing 23. Furthermore in comparison to EXAMPLE 1-I, it is possible to increase the contact area of the cooling oil and stator core 5 and to further improve cooling performance with respect to the teeth 11.

Since the cooling medium passage 22 comprises a plurality of grooves opening onto the wall face of the housing 23 for the stator coils 14, formation of the stator core 5 with the cooling medium passage 22 is facilitated.

EXAMPLE 1-IV

Figure 9:
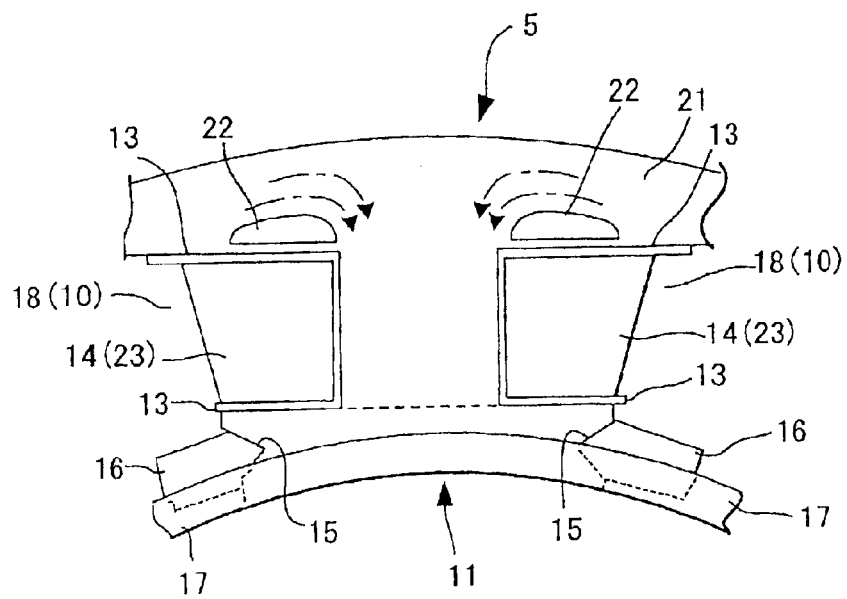
FIG. 9 is a partially enlarged end view of a stator core having a fourth example of a cooling passage according to the first embodiment.

FIG. 9 is a partially enlarged end view of a stator core 5 provided with a cooling medium passage 22 according to EXAMPLE 1-IV. Referring to FIG. 9, the coil end of the stator coil 14 and the insulating body 12 are omitted. Although the cooling medium passage 22 shown in FIG. 9 is similar to the cooling medium passage 22 shown in FIG. 4A, the shape of the cooling medium passage 22 in FIG. 9 differs from the shape of the cooling medium passage in FIG. 4A.

The cooling medium passage 22 shown in FIG. 9 is formed in a semi-cylindrical shape. Thus, as shown in FIG. 9, the cooling medium passage 22 has an opening of a convex shape. The central section of the cooling medium passage 22 dilates towards the outer periphery of the stator core 5 and the width (amount of dilation) of the cooling medium passage 22 decreases towards both right and left ends in a longitudinal direction (substantially with respect to the circumferential direction of the stator core 5). On the other hand, the cooling medium passage 22 shown in FIG. 4A has a maximum width at the end near to the teeth 11. The width of the cooling medium passage 22 of FIG. 4A decreases towards the center of the slot 10 in a longitudinal direction.

Magnetic flux is allowed to flow smoothly in the direction of the arrow on the dot-dash line in FIG. 9 because the cooling medium passage 22 is formed in a semi-cylindrical shape as described above.

In particular, when magnetic flux flows from the back core 21 to the teeth 11, the magnetic flux flows smoothly into the teeth 11. In this manner, reductions in the output of the motor are avoided to a greater degree than EXAMPLE 1-I.

Since reductions in the output of the motor are suppressed by regulating the shape of the cooling medium passage 22, it is possible to adapt the overall shape of the opening of the plurality of cooling medium passages 22 shown in FIG. 7 or FIG. 8 into a convex shape.

Next, referring to FIG. 10 to FIG. 22, a second embodiment of this invention will be described. In the figures, those members which are similar as those described with reference to the first embodiment are designated by the same reference numerals and additional description will be omitted. In the same manner as the first embodiment, the second embodiment is provided with two types of cooling passages: a first cooling medium passage in the slot and a second cooling passage in the stator core.

Figure 10:
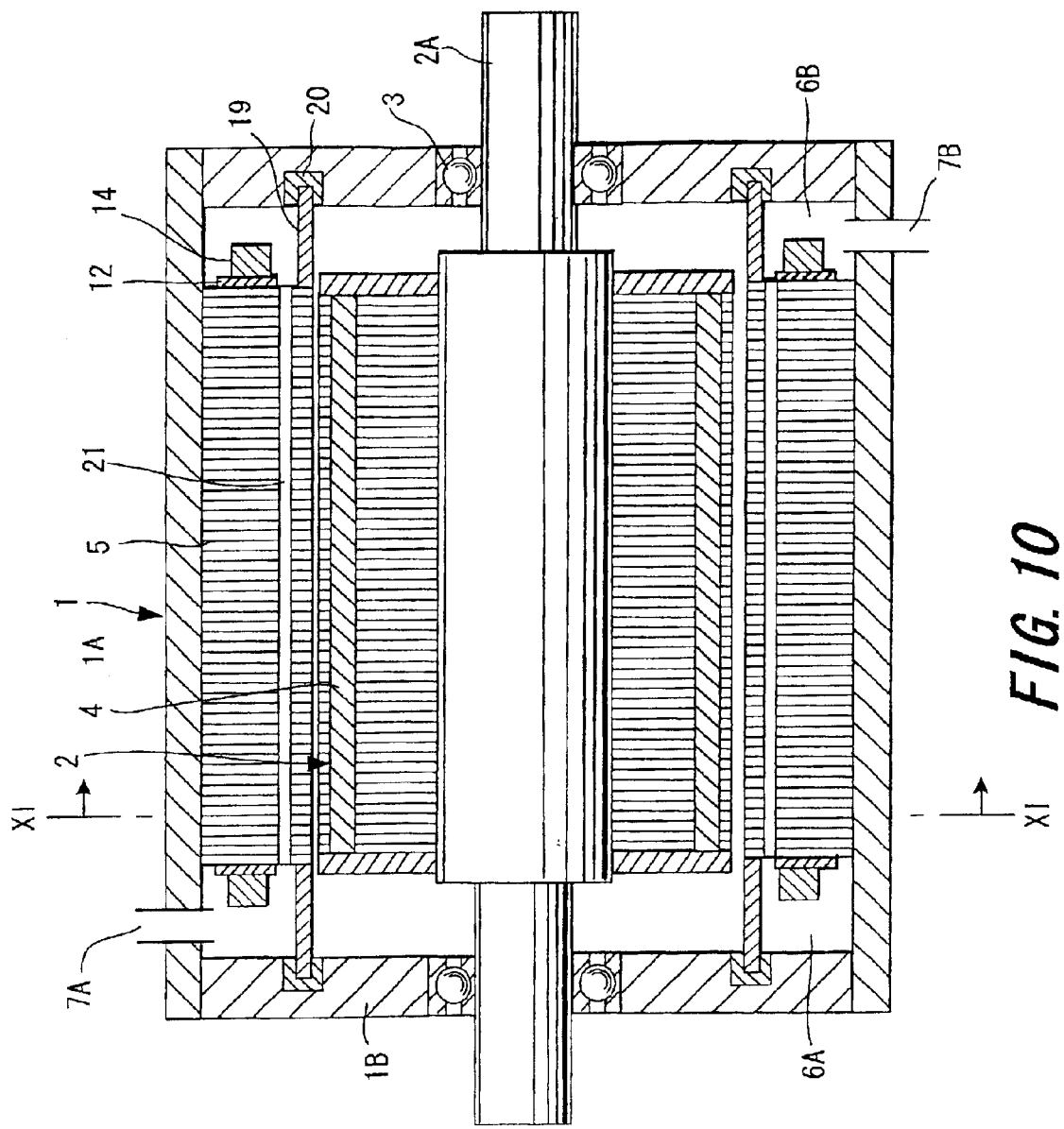
FIG. 10 is a cross sectional view along an axial direction of a rotating electrical machine provided with a cooling mechanism according to a second embodiment of this invention.
Figure 11:
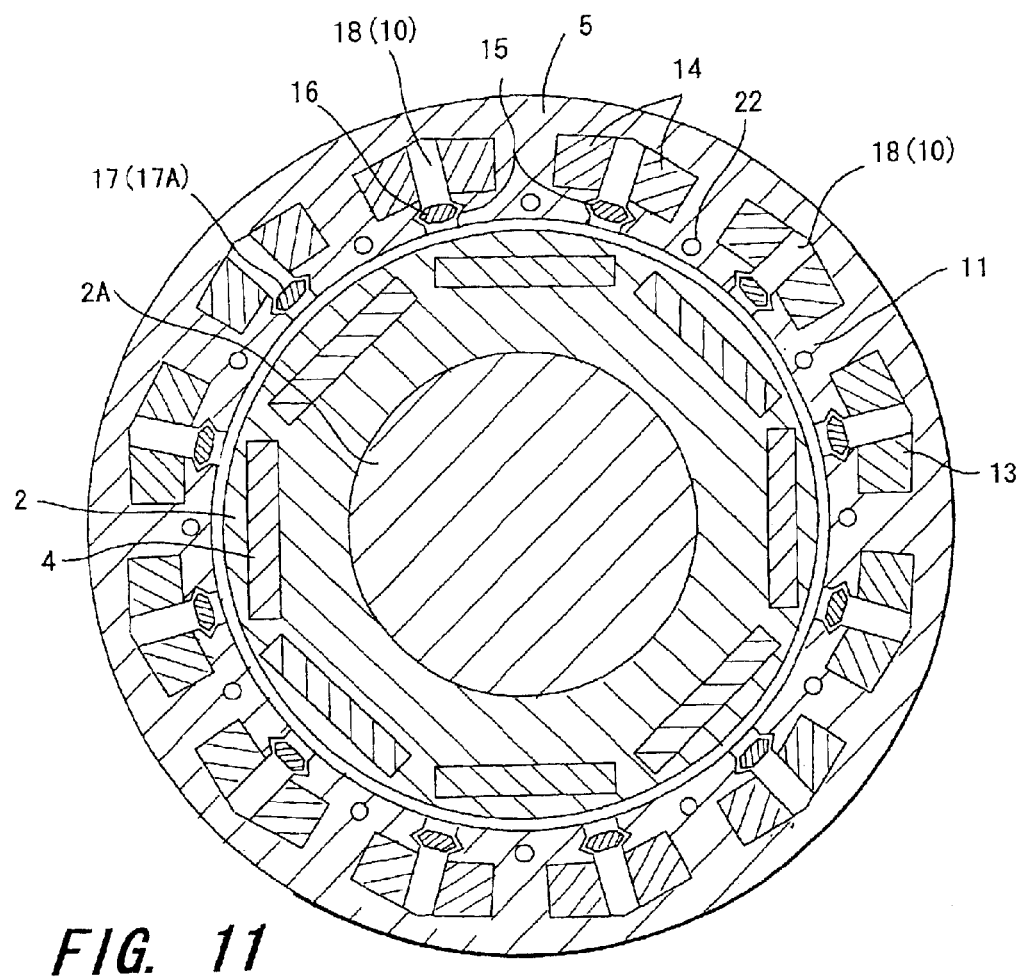
FIG. 11 is a cross sectional view orthogonal to an axial direction of a rotating electrical machine provided with a cooling mechanism according to the second embodiment of this invention. This cross sectional view is taken along XI—XI line of FIG. 10.

Although the second embodiment is similar to the first embodiment, the second embodiment differs from the first embodiment with respect to the provision of a second cooling medium passage passing through the stator core in an axial direction. Referring to FIG. 10 and FIG. 11, a cooling medium passage 22 is provided in each of the teeth 11 of the stator core 5. The cooling medium passage 22 opens into the inner radial side of the trunk 11b covered by the coil end of the stator coils 14. That is to say, the cooling medium passage 22 is positioned on the tip 11a. The opening of the cooling medium passage 22 is further positioned on the outer radial side of the cylindrical section 19. An actual example of the cooling medium passage 22 will be described in detail below. For the purposes of description, a cooling medium passage 22 according to EXAMPLE 2-I as described hereafter is shown in FIG. 10 and FIG. 11.

EXAMPLE 2-I

Figure 12:
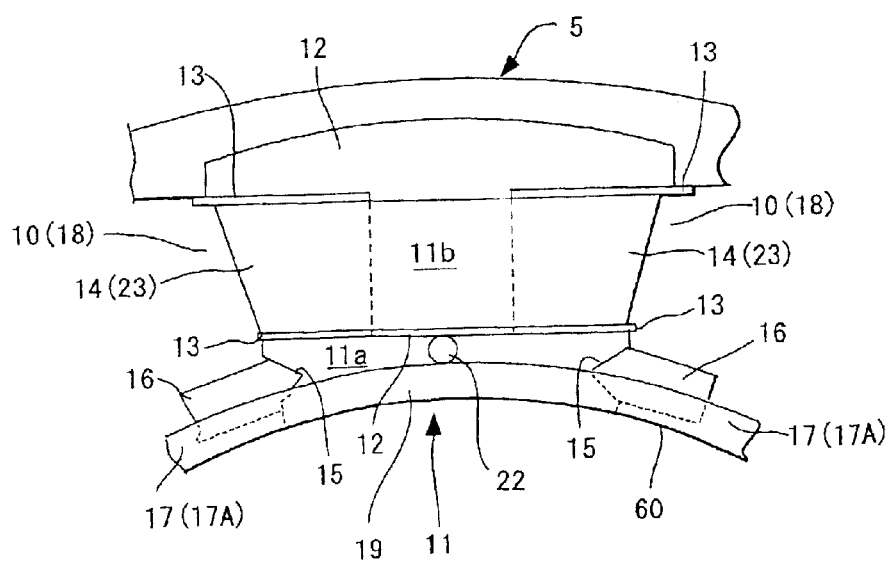
FIG. 12 is a partially enlarged end view of a stator core having a first example of a cooling passage according to the second embodiment.

FIG. 12 is a partially enlarged end view including teeth 11 of the stator core 5 and shows an EXAMPLE 2-I according to a second embodiment of a cooling medium passage 22. The cooling medium passage 22 is formed in the tip 11a between the cylindrical section 19 and the stator coil 14.

Figure 13:
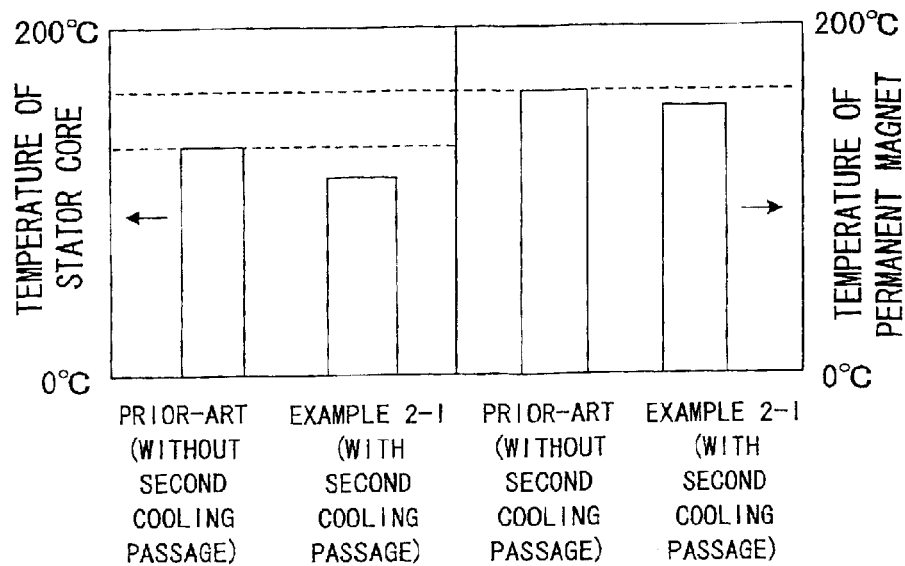
FIG. 13 is a graph showing a comparison of a conventional example and the first example in the second embodiment with respect to the cooling effect.

FIG. 13 shows the temperature of a synchronous motor with permanent magnets according to EXAMPLE 2-I and a synchronous motor with permanent magnets according to the prior-art example during steady-state operation. The difference between the two motors resides in the fact of whether or not a cooling medium passage 22 is provided. Referring to FIG. 13, in comparison to a prior-art example provided with only a cooling passage 18, a motor provided with a cooling medium passage 22 through the teeth 11 in addition to the cooling passage 18 reduces both the temperature of the stator core 5 and the temperature of the magnets 4 housed on the rotor 2.

Figure 14:
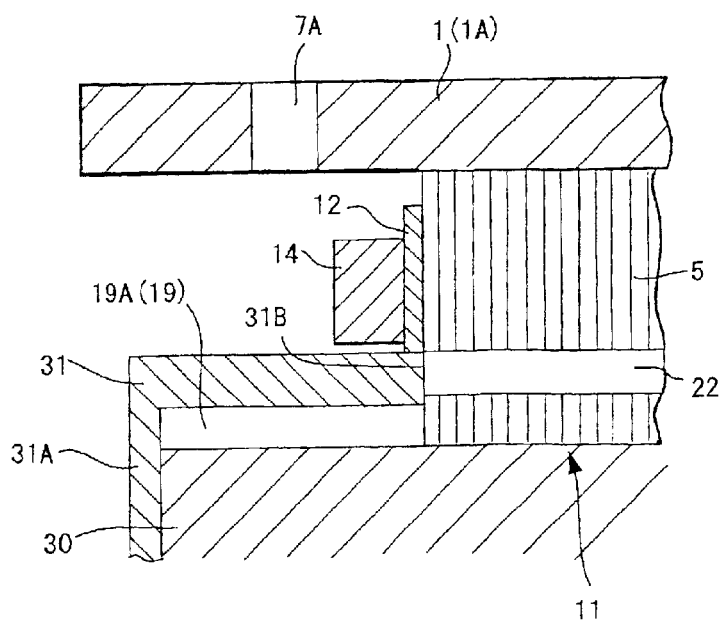
FIG. 14 is a cross sectional view of a stator core along an axial direction showing a method of molding a cylindrical section according to the second embodiment.
Figure 15:
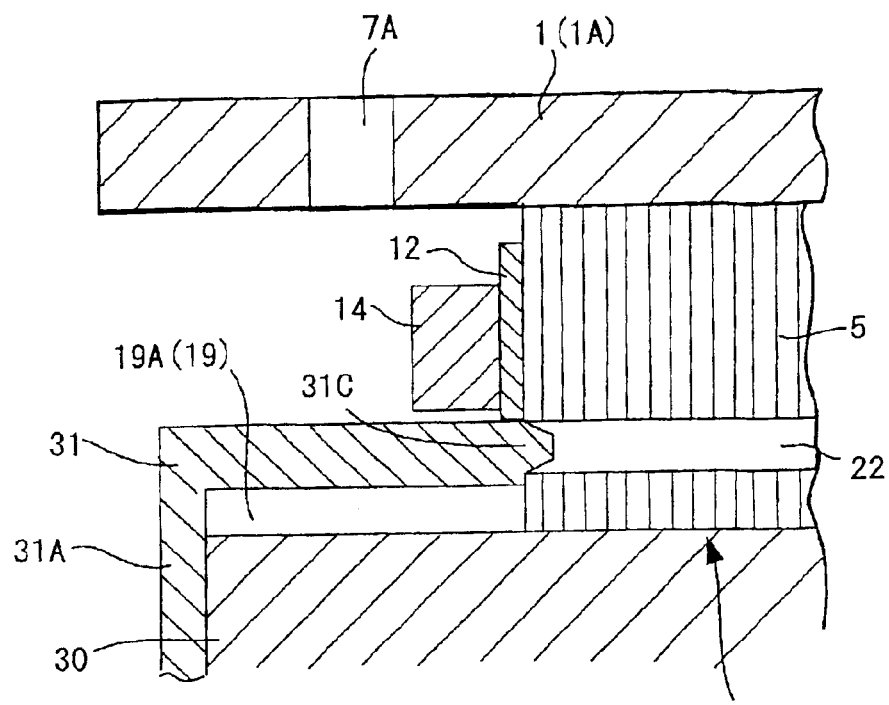
FIG. 15 is a cross sectional view of a stator core along an axial direction showing another method of molding a cylindrical section according to the second embodiment.

The cylindrical section 19 projecting from the end of the stator core 5 is molded by the method as shown in FIG. 14 or FIG. 15 so that the opening of the cooling medium passage 22 is not covered.

FIG. 14 shows a stator core 5 fixed to the inner face of the cylindrical section 1A of the case 1. An insulating body 12 is disposed on the end face of each tooth 11. Furthermore, in the slot 10, insulating paper 13 is disposed in contact with the stator core 5.

The stator coils 14 are housed in the slot 10 and wound onto the trunk 11b covered by the insulating paper 13. Although not shown in the figures, both ends of a plate 16 are engaged in an engaging groove 15 oriented in an axial direction in the opening of each slot 10.

An inner mold 30 has a cylindrical shape with a diameter equal to the inner diameter of the stator core 5 and is inserted into the stator core 5. The length of the inner mold 30 in an axial direction is greater than the axial dimensions of the stator core 5 and both ends of the inner mold 30 project with the same length from the stator core 5.

The outer mold 31 is formed as a cylinder having an inner diameter which is larger than the outer diameter of the inner mold 30 by the thickness of the cylindrical section 19. The outer mold 31 is disposed in contact with the end face of the inner mold 30 and the end face of the stator core 5. The bottom 31A of the outer mold 31 makes contact with the end face of the inner mold 30. The circular end face 31B of the outer mold 31 makes contact with a section of the stator-core's end face, on the section stator coils 14 being not wound. In this manner, a space 19A to be filled with resin is formed by the inner mold 30, the outer mold 31, the plate 16 and the stator core 5. The space 19A includes the space forming the cylindrical section 19 which projects from the end face of the stator core 5 and also includes the space 17A forming the resin layer 17 between the plate 16 and the inner mold 30.

A circular end face 31B of the outer mold 31 covers the plurality of cooling medium passages 22 disposed in the stator core 5 by abutting with the end face of the stator core 5. The inner diameter of the outer mold 31 is smaller than the inner diameter of a circle formed by joining up the innermost positions of the plurality of cooling medium passages 22. Consequently the space 19A is separated from the cooling medium passage 22. As a result, when resin fills the space 19A, it is possible to ensure that the cooling medium passage 22 will not be sealed as a result of leakage of resin into the cooling medium passage 22. The minimum inner diameter of the outer mold 31 may be determined by taking into account the pressure during resin filling operations or the flow characteristics of the resin, so as to prevent resin from entering into the cooling medium passage 22. The positioning operation of the outer mold 31 may be performed using a positioning jig (not shown) or by placing the outer peripheral face of the outer mold 31 into contact with the inner peripheral end faces of the plurality of insulating bodies 12 on the stator core 5 as shown in the FIG. 14.

The cylindrical section 19 and the resin layer 17 are formed together along the cylindrical inner face 60 of the stator core 5 by filling the space 19A formed by the inner mold 30, the outer mold 31, the plate 16 and the stator core 5 with resin. In practice, the surface of the inner mold 30 and the outer mold 31 may be formed with a slight incline in order to extract the inner mold 30 from the inner periphery of the stator core 5 or to extract the outer mold 31 from the cylindrical section 19.

A second method of molding is shown in FIG. 15. The method of positioning the outer mold 31 differs from the first molding method shown in FIG. 14. In FIG. 14, the molding method is performed by a positioning jig or by the end face of the insulating body 12. However as shown in FIG. 15, the positioning operation of the outer mold 31 is performed by a projection 31C which engages with the open end of the cooling medium passage 22. This facilitates the positioning of the outer mold 31 with respect to the stator core 5. At least three projections 31C are provided in the outer mold 31.

In EXAMPLE 2-I, a cooling medium passage 22 which is axially disposed with respect to the stator core 5 is provided in the tip 11a of the teeth 11 outside of the range of windings on the stator coils 14. As a result, a cooling medium passage 22 is formed without being hidden by the stator coils 14 and cooling medium can flow without resistance from the stator coils 14 into the cooling medium passage 22.

A cooling medium passage 22 is disposed axially with respect to the stator core 5 and opens on the outer radial side of the cylindrical section 19 of the teeth 11. Since the cooling medium passage 22 is not covered by resin, it is possible for cooling medium to flow into the cooling medium passage 22 without resistance.

The stator core 5 is cooled by a cooling medium which flows in the cooling medium passage 22. Furthermore the tip 11a of the teeth 11 is cooled by the cooling medium passage 22 and heat in the rotor 2 is absorbed by the tip of the teeth 11 through an air gap. Consequently the cooling medium passage 22 indirectly reduces the temperature of the rotor 2.

EXAMPLE 2-II

Figure 16:
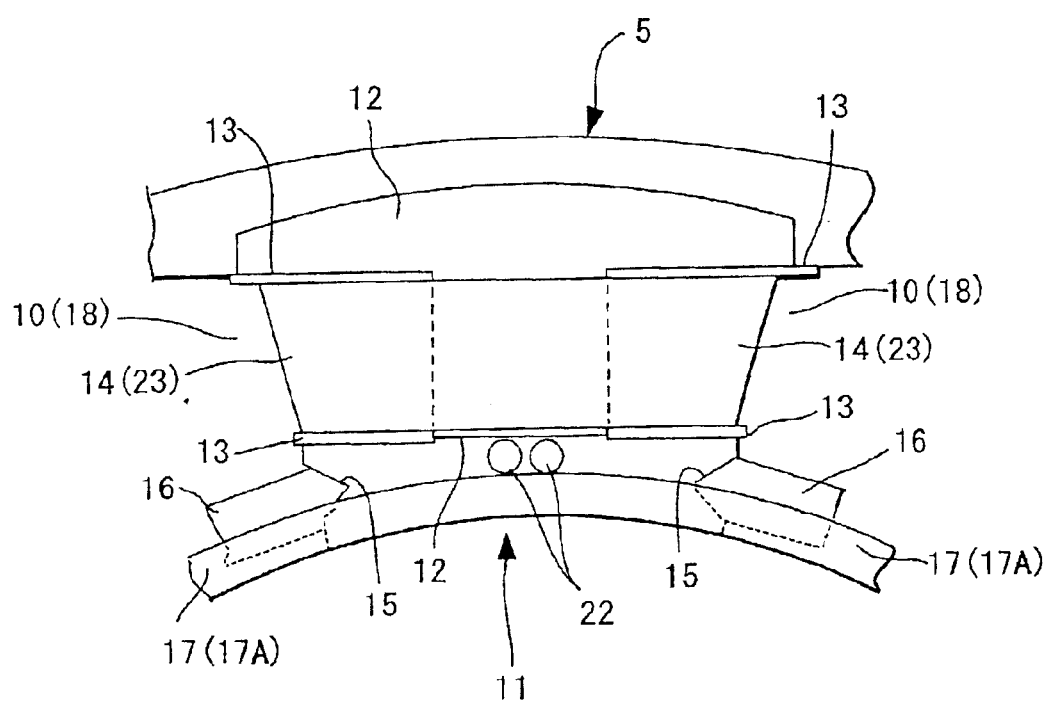
FIG. 16 is a partially enlarged end view of a stator core according to a second example of a cooling passage in the second embodiment.

FIG. 16 shows a partially enlarged end view of a stator core 5 with a cooling medium passage 22 according to the example 2-II. Referring to FIG. 16, a plurality of cooling medium passages 22 is disposed along a circumferential direction on the tip 11a of each tooth 11. The total cross sectional area of the cooling medium passages in the stator core 5 is increased in comparison to EXAMPLE 2-I. Also, the flow amount of cooling medium and the cooling performance of the tip of the teeth 11 is increased in comparison to EXAMPLE 2-I.

EXAMPLE 2-III

Figure 17:
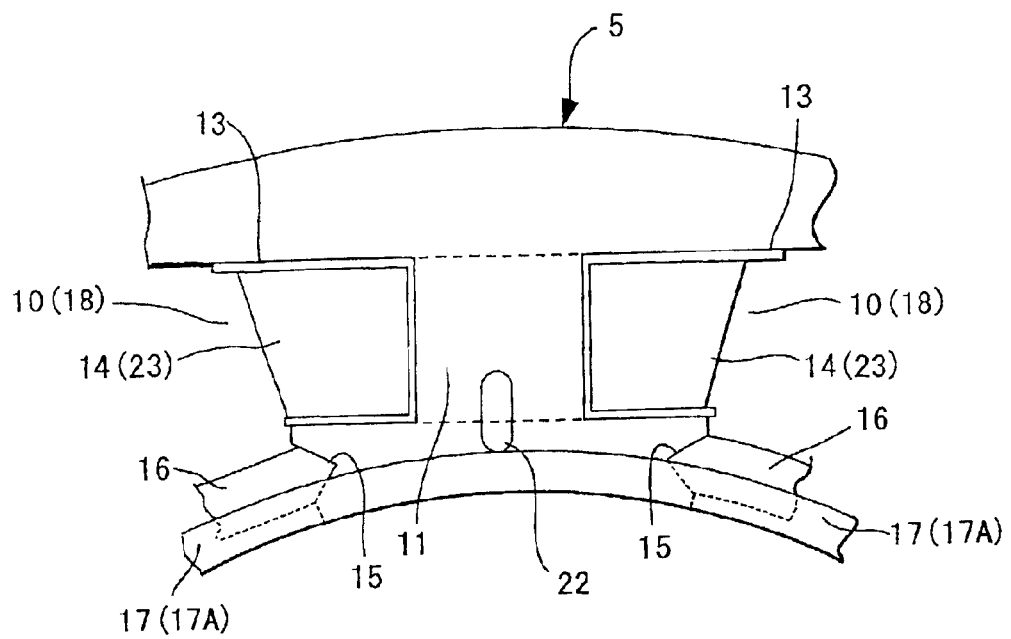
FIG. 17 is a partially enlarged end view of a stator core according to a third example of a cooling passage in the second embodiment.

FIG. 17 shows a partially enlarged end view of a stator core 5 with a cooling medium passage 22 according to EXAMPLE 2-III. FIG. 17 removes the representation of the stator coils 14 on the end face of the teeth 11 and represents the range of windings by the dotted line. The representation of the insulating body 12 is also omitted.

In FIG. 17, the cooling medium passage 22 is expanded with respect to the outer periphery of the stator core 5 and distended towards the trunk 11a of the teeth 11 on which the stator coils 14 are wound. The trunk 11a is the range surrounded by the dotted line in FIG. 17 and the insulating body 12 covers the end face of the trunk 11a. The insulating body 12 and the stator coils 14 partially cover the opening of the cooling medium passage 22.

Although a section of the cooling medium passage 22 is partially covered by the stator coils 14 and the insulating body 12, the section merely corresponds to the inlet/outlet of the cooling medium passage 22. Since the cross-sectional area of the cooling medium passage 22 is enlarged, flow resistance is reduced in comparison with EXAMPLE 2-I, thereby enabling an increase in the flow rate of cooling medium in the cooling medium passage 22. Furthermore the cooling performance of the rotating electric machine is improved due to the increase in the contact area of cooling medium with the stator core 5. As a result, the cooling effect on the tips of the teeth 11 of the stator core 5 is improved in comparison with EXAMPLE 2-I and thus, the rotor 2 is indirectly cooled more strongly than EXAMPLE 2-I.

Furthermore the flow of magnetic flux is not impeded by the cooling medium passage 22 and thus only a small reduction in the output of the rotating electric machine is caused by the cooling medium passage 22 because the cooling medium passage 22 is formed in parallel to the flow of magnetic flux in the teeth 11.

EXAMPLE 2-IV

Figure 18:
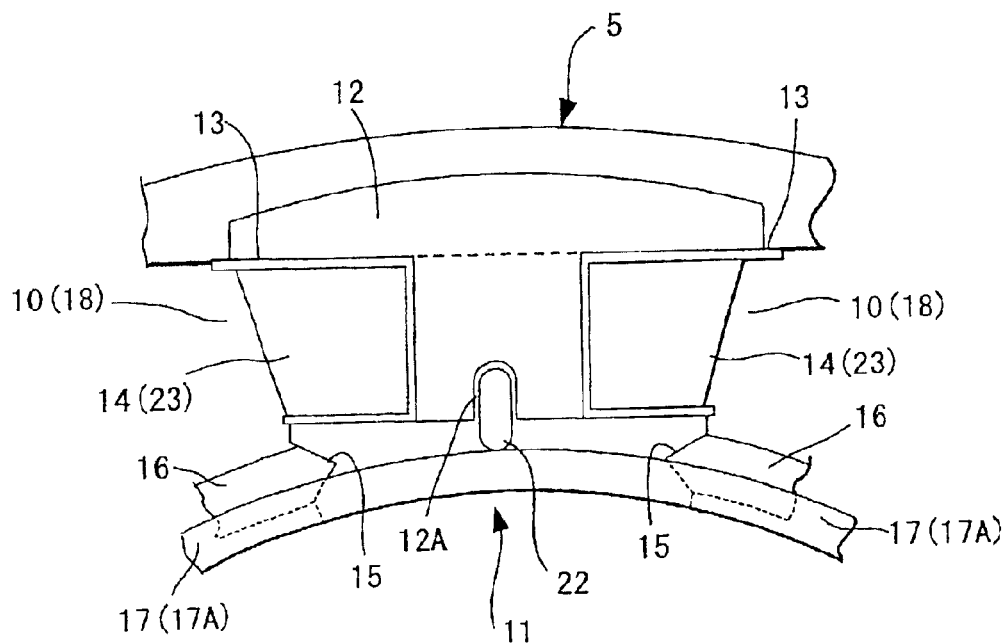
FIG. 18 is a partially enlarged end view of a stator core according to a fourth example of a cooling passage in the second embodiment.

FIG. 18 shows a partially enlarged end view of a stator core 5 with a cooling medium passage 22 according to EXAMPLE 2-IV. FIG. 18 omits the representation of the stator coils 14 partially on the end face of the teeth 11 and represents the range of windings by (the dotted line. However, the insulating body 12 is illustrated.

Although in EXAMPLE 2-III of FIG. 17, the inlet/outlet of the cooling medium passage 22 is partially covered by the insulating body 12, in FIG. 18, the insulating body 12 is provided with a notch 12A cut from the end with the same shape as the cooling medium passage 22. There is no modification of the stator coils 14 partially covering the opening of the cooling medium passage 22.

Figure 19:
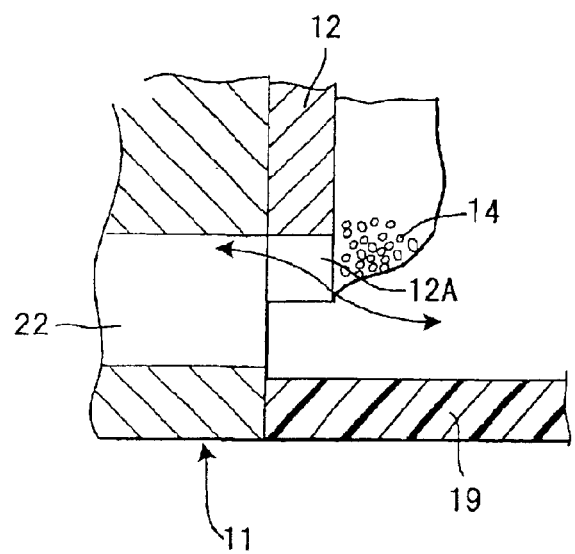
FIG. 19 is a cross sectional view of a stator core along an axial direction according to a fourth example of a cooling passage in the second embodiment.

Referring to FIG. 19, in the same manner as FIG. 17, the opening of the cooling medium passage 22 is partially covered by the stator coils 14. However since the insulating body 12 does not cover the opening of the cooling medium passage 22, cooling medium tends to seep into the cooling medium passage 22. As a result, cooling medium can flow as shown by the arrow in FIG. 19. Thus it is possible to reduce the flow resistance and to increase the flow amount of cooling medium in comparison to EXAMPLE 2-III of FIG. 17.

EXAMPLE 2-V

Figure 20:
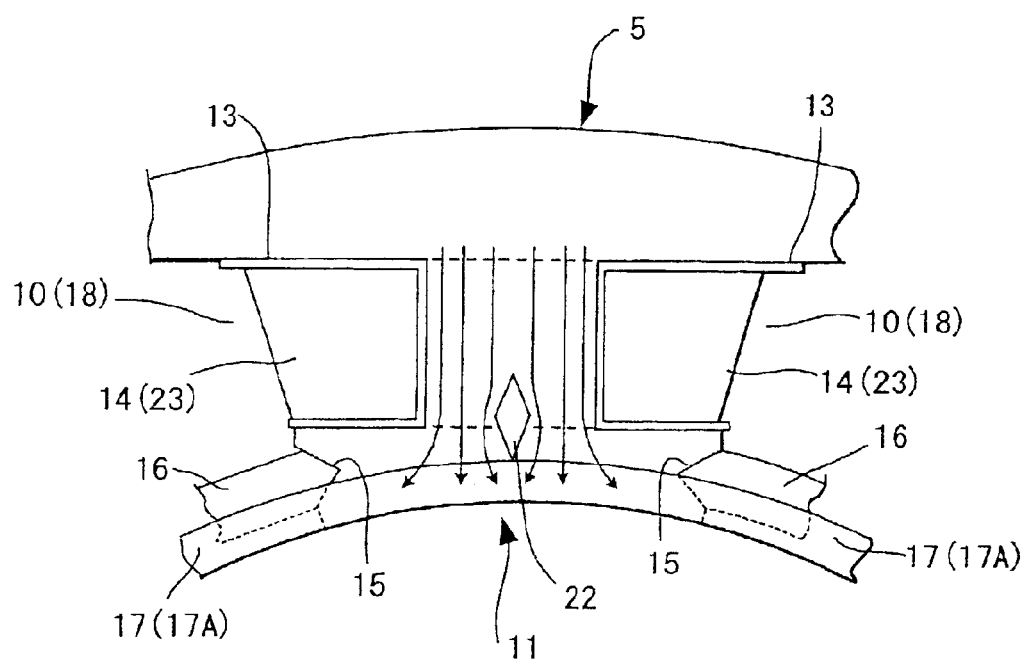
FIG. 20 is a partially enlarged end view of a stator core according to a fifth example of a cooling passage in the second embodiment.

FIG. 20 shows a partially enlarged end view of a stator core 5 with a cooling medium passage 22 according to EXAMPLE 2-V. FIG. 20 removes the representation of the stator coils 14 on the end face of the teeth 11 and represents the range of windings by the dotted line. The representation of the insulating body 12 is also omitted.

In FIG. 20, the cooling medium passage 22 has a cross sectional shape substantially in the form of a rhombus in which the dimension along the radial direction of the stator core 5 is longer than the dimension along the circumferential direction of the stator core 5. The longitudinal direction of the cooling medium passage 22 corresponds to the radial direction of the stator core 5. In this manner, the flow amount of cooling medium is increased by enlarging the cross sectional area of the cooling medium passage 22.

The cooling medium passage 22 which is elongated along a radial direction of the stator core 5 is disposed along the direction of flow of magnetic flux in the teeth 11. Since the acute-angle section in the passage cross section is disposed near to the inner periphery of the stator core 5 and the outer peripheral side of the stator core 5, magnetic flux flows gently as shown by the arrow in FIG. 20. In the EXAMPLE 2-V, although the cooling performance of the cooling medium passage 22 is increased in comparison with EXAMPLE 2-I, almost no reduction is registered in the output of the rotating electric machine.

In EXAMPLE 2-V, in the same manner as FIG. 18, it is possible to reduce flow resistance at the inlet/outlet of the cooling medium passage 22 by forming a notch in the insulating body 12.

EXAMPLE 2-VI

Figure 21:
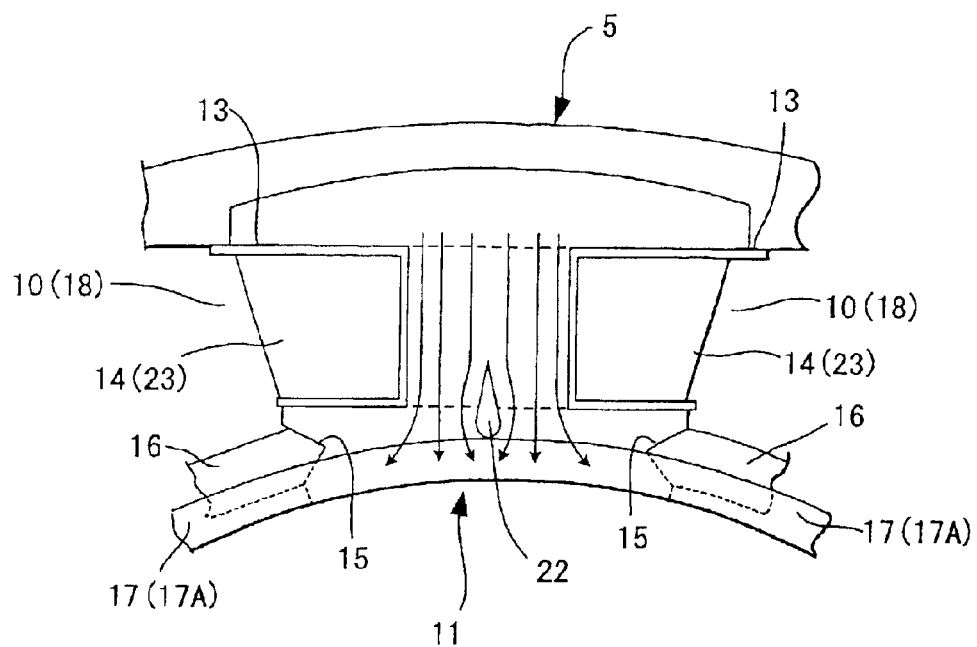
FIG. 21 is a partially enlarged end view of a stator core according to a sixth example of a cooling passage in the second embodiment.

FIG. 21 shows a partially enlarged end view of a stator core 5 with a cooling medium passage 22 according to EXAMPLE 2-VI. FIG. 21 removes the representation of the stator coils 14 on the end face of the teeth 11 and represents the range of windings by the dotted line. The representation of the insulating body 12 is also omitted.

In FIG. 21, the cooling medium passage 22 has a cross-sectional shape substantially in the form of a tear drop in which the width increases towards the inner radial side of the stator core 5. The longitudinal direction of the cooling medium passage 22 corresponds to the radial direction of the stator core 5.

Figure 32:
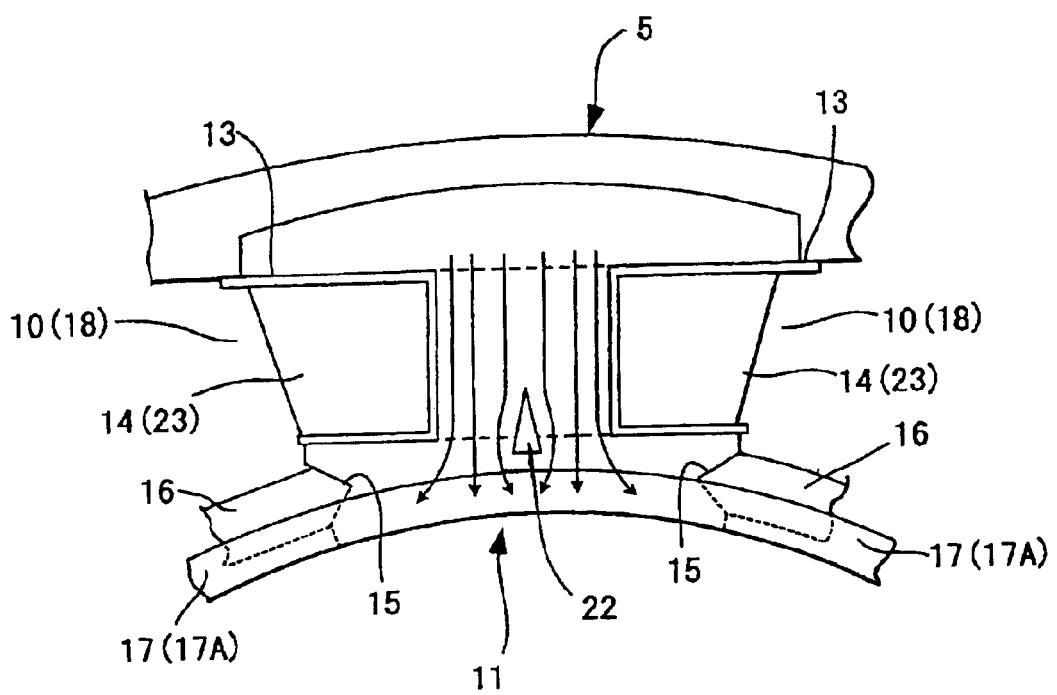
FIG. 32 is a partially enlarged end view of a stator core according to another example of a cooling passage.

In FIG. 32, the cooling medium passage 22 has a cross-sectional shape substantially in the form of a triangle in which the height with respect to the radial direction of the stator core is larger than the bottom edge perpendicular to the radial direction.

In this manner, the passage cross-sectional area of the cooling medium passage 22 is enlarged and it is possible to increase the flow rate of cooling medium in comparison with EXAMPLE 2-I.

In the EXAMPLE 2-VI, although the passage cross sectional area is increased, the cooling medium passage 22 is disposed along the direction of flow of magnetic flux in the teeth 11. Although the cooling performance of the cooling medium passage 22 is increased in comparison with EXAMPLE 2-I, almost no reduction in the output of the rotating electric machine is registered.

In the EXAMPLE 2-VI, in the same manner as in EXAMPLE 2-IV of FIG. 18, the flow resistance at the inlet/outlet of the cooling medium passage 22 is reduced by forming a notch in the insulating body 12.

EXAMPLE 2-VII

Figure 22:
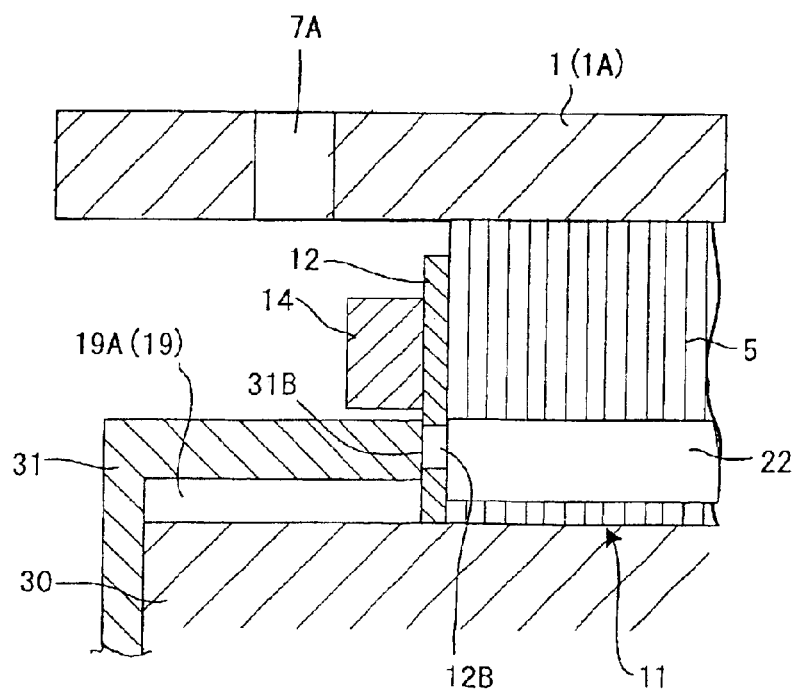
FIG. 22 is a cross sectional view of a stator core along an axial direction according to a seventh example of a cooling passage in the second embodiment.

FIG. 22 shows a partially enlarged sectional view of a stator core with a cooling medium passage 22 according to an EXAMPLE 2-VII. In FIG. 22, the insulating body 12 is formed in the same shape as the teeth 11 and extends to the tip of the teeth 11. However, the insulating body 12 is provided with a hole 12B communicating with the cooling medium passage 22. The circular end face 31B of the outer mold 31 covers the hole 12B during resin injection operations. Resin is introduced into the space 19A formed by the outer mold 31, the inner mold 30, the plate 16 and the stator core 5 and allowed to harden. In the same manner as FIG. 14 and FIG. 15, a resin layer is formed on the inner peripheral side of the stator core 5. However, the resin layer 17 is integrated with the insulating body 12.

The cooling medium passage 22 is connected with the cooling jacket 6A, 6B through the hole 12B in the insulating body 12. If the cooling medium passage 22 is merely connected with the hole 12B of the insulating body 12, the connection between the cooling jackets 6A, 6B will be improved. This results in increased discretion with respect to the positioning of the cooling medium passage 22 on the teeth 11. Here, the cross-sectional shape of the cooling medium passage 22 may take any of the shapes described above. Furthermore since the insulating body 12 is integrated with the resin layer 17 and the cylindrical section 19, leakage of cooling medium towards the rotor 2 is prevented.

Next, referring to FIG. 23 to FIG. 31, a third embodiment of this invention will be described. In the figures, members which are the same as those described with reference to the first and second embodiments are designated by the same reference numerals and additional description is omitted. The third embodiment is provided, with two types of cooling passage in the same manner as the first and second embodiments. However the third embodiment differs from the first and second embodiments with respect to the following point. A cooling medium passage is not provided in the stator core. Instead a cooling medium passage is provided between the stator core and the insulating body which insulates the stator core and the stator coils or between the stator core and the stator coils. Thus it is possible to cool the stator core directly without impediment by the insulating paper, unlike the first and second embodiments. A common feature of the first, second and third embodiments is that they are provided with a first cooling medium passage formed in the slot by sealing the slot opening facing the rotor; and a second cooling medium passage wherein the stator core forms at least a section of the passage wall of the second cooling medium passage.

Figure 23A:
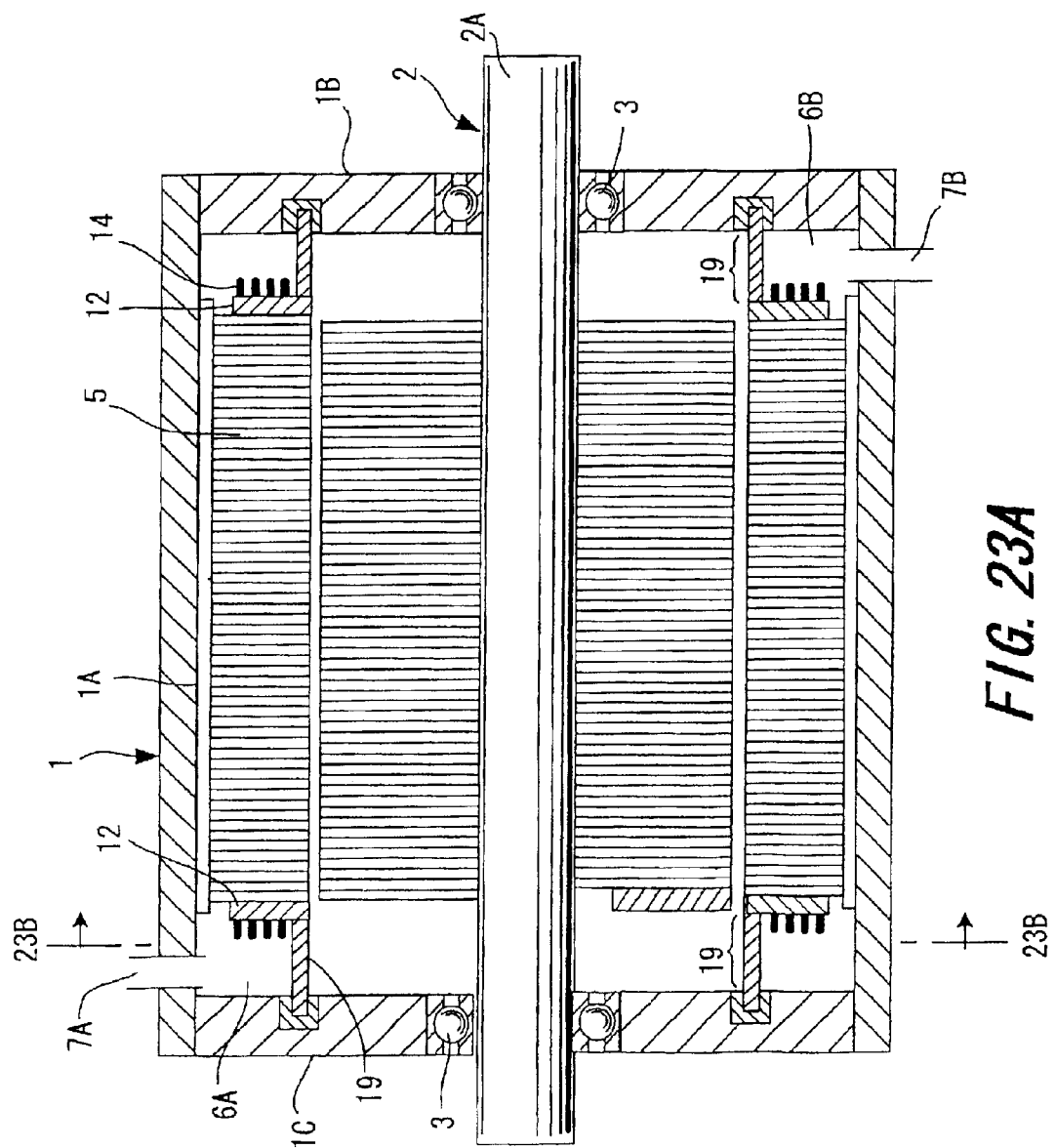
FIG. 23A is a cross sectional view along an axial direction of a rotating electric machine according to a third embodiment.
Figure 23B:
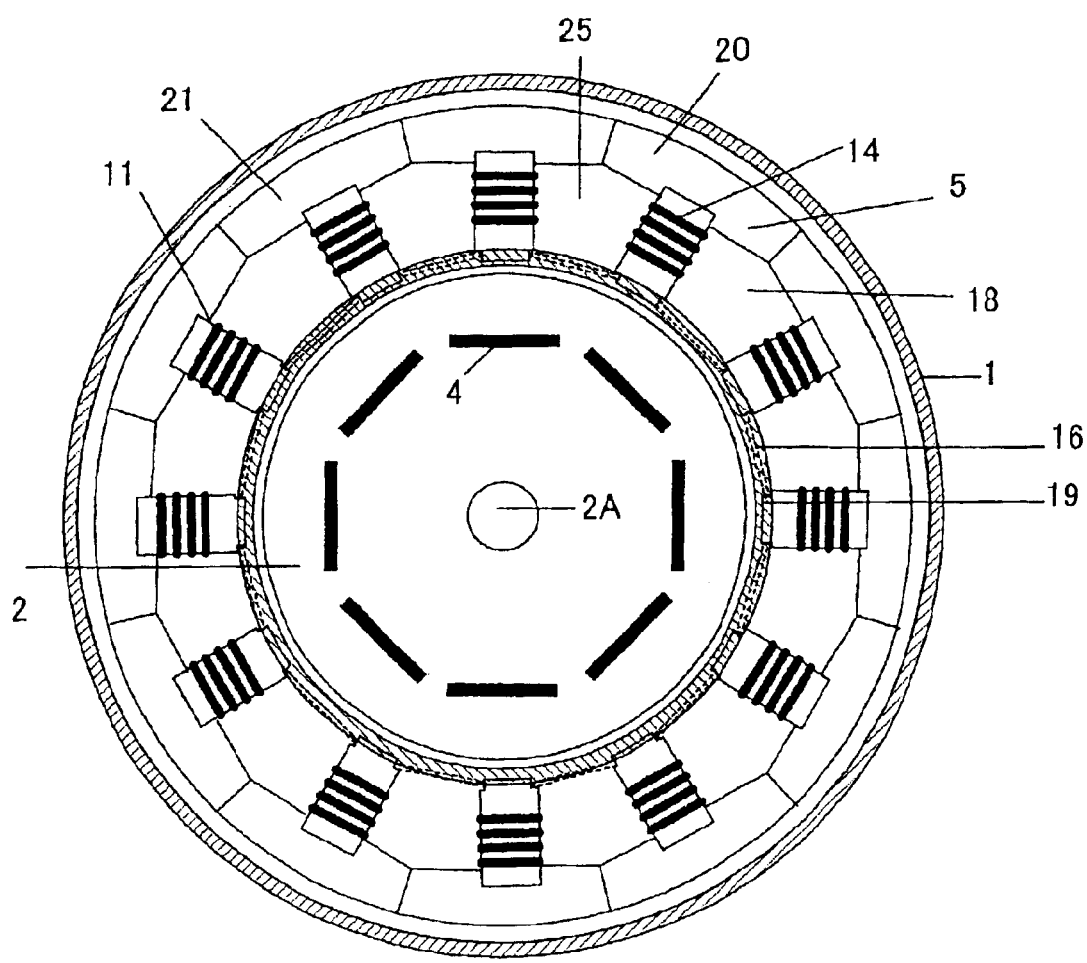
FIG. 23B is a cross sectional view orthogonal to an axial direction of a rotating electric machine according to the third embodiment of this invention. The cross sectional view of FIG. 23B is taken along 23B—23B line of FIG. 23A.

FIG. 23A is a sectional view along the axial direction of a rotating electric machine adapted for use with the third embodiment. FIG. 23B is a cross sectional view along a direction perpendicular to an axial direction of a rotating electric machine adapted for use with the third embodiment. The rotating electric machine is provided with a stator core 5 in which a plurality of divided stator cores are connected along the circumferential direction of the stator core. Referring to FIG. 23A and FIG. 23B, in contradistinction to the first and second embodiments, a cooling medium passage is not provided in the stator core. However in addition to a first cooling medium passage provided in the entire slot, a second cooling passage for which the stator core forms at least a section of the passage wall is provided in order to increase the cooling performance without reducing the output of the motor.

Examples of the second cooling medium passage according to the third embodiment will be described referring to FIG. 24 to FIG. 31. In the figures, although the wire comprising the stator coils 14 is separated by an interval for the purposes of description, it is actually the case that no such interval is present between the wire coilings.

EXAMPLE 3-I

Figure 24C:
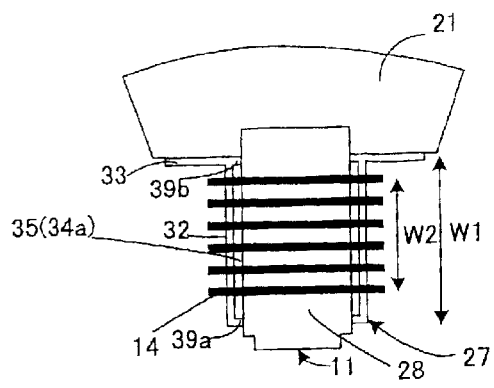
FIG. 24C is a front view.

As shown in FIG. 24A–FIG. 24C, an insulating side plate 27 and an insulating end plate 28 are disposed in order to form a second cooling medium passage for directly cooling of the stator core 5.

The insulating side plate 27 and an insulating end plate 28 are disposed on the periphery of the stator core 5 on which the stator coils 14 are wound so that the stator coils 14 do not come into direct contact with the stator core 5. The insulating side plates 27 are disposed along the back core 21 and both side faces of the teeth 11 of the stator core 5. The insulating end plate 28 covers both ends of the stator core 5. The two insulating plates prevent direct contact of the stator core 5 with the stator coils 14. In order to form a cooling passage, plate-shaped members molded from resin are used as the insulating end plate 27 and the insulating side plate 28. The length of the insulating side plate 27 with respect to the axis of rotation is equal to the length of the stator core 5 in an axial direction, or the length resulting from the addition of the thickness of the end plate 31 to the axial length of the stator core 5.

The insulating side plate 27 has a cross sectional shape in substantially the shape of a letter "L" and comprises a transverse section 33 extending along the back core 21 and a longitudinal section 32 extending along the tooth of the stator core 5. A projection 39a, 39b is formed towards the stator core 5 on the end of the longitudinal section 32. Consequently an indentation 34a is formed facing the teeth 11. The indentation 34a forms a space used as a cooling passage 35. Since cooling liquid flows between the insulating side plate 27 and the side face of the teeth 11, the teeth 11 are directly cooled by the cooling medium. An insulating side plate 27 is disposed on both sides of the teeth 11, and thus the cooling passage 35 is formed on both sides of the teeth 11. When the teeth 11 are viewed in an axial direction, the insulating end plate 28 has the same shape as the end of the teeth 11. Thus, an opening is formed between both sides of the insulating end plate 28 and the insulating side plate 27. A part of the cooling liquid from the cooling jacket 6A flows into the stator cooling passage 35.

Figure 24C:
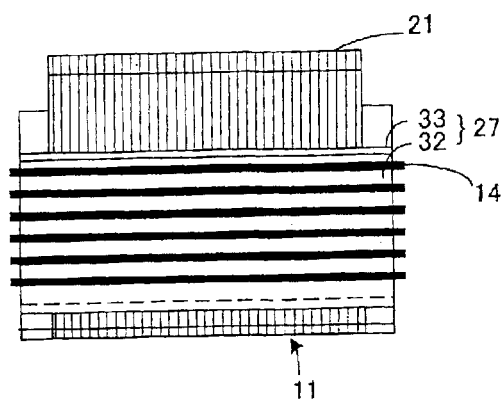
Figure 24C:
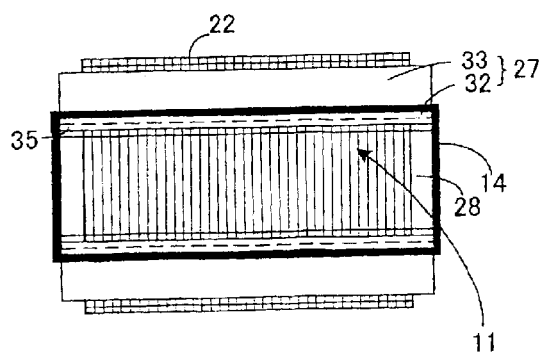

In FIG. 24, although the wire of the stator coils 14 is shown with an interval therebetween in order to facilitate comprehension of the position of the insulating side plate 27 with stator coils 14 wound thereon, when the winding method of the stator coils 14 is a method of concentrated winding, almost no space actually exists between the wire of the coils. Thus almost no cooling liquid flows between the wires of the stator coils.

In this embodiment, the width W2 of the winding range of coils on the teeth 11 is shorter than the width W1 on the longitudinal section 32 of the insulating side plate 27. Consequently the longitudinal section 32 projects towards the tip of the teeth 11 more than the stator coils 14. Since the entire opening of the cooling passage 35 is not covered by the stator coils 14, sufficient flow of cooling liquid in the cooling passage 35 is ensured and it is possible to directly cool the stator core 5 with the cooling liquid. Since it is possible realize sufficient reductions in the temperature of the tip of the teeth 11 in the above manner, heat generated by the permanent magnets 4 is emitted to the stator core 5 and overheating of the permanent magnets 4 can be prevented.

EXAMPLE 3-II

Figure 25A:
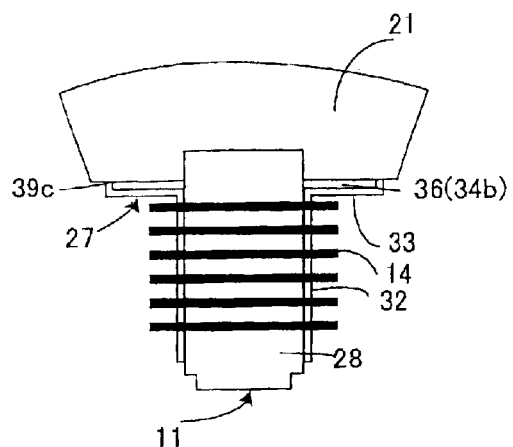
FIG. 25A is an end view.
Figure 25B:
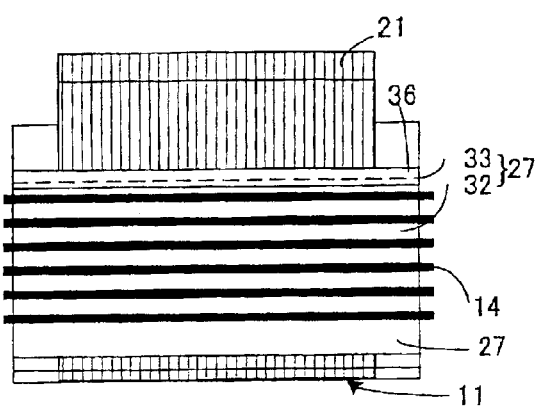
FIG. 25B is a side view.
Figure 25C:
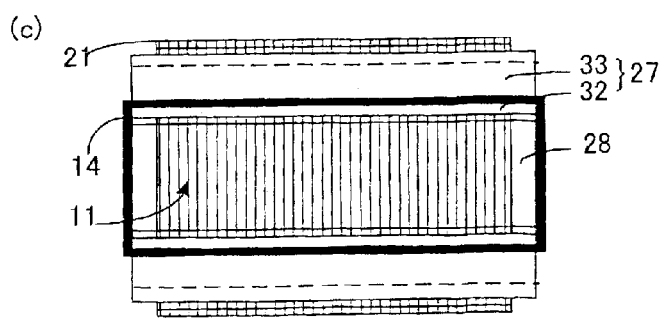
FIG. 25C is a front view.

FIG. 25A–FIG. 25C show the structure of EXAMPLE 3-II of the second cooling passage. In EXAMPLE 3-II, the cooling passage 36 is formed between the transverse section 33 and the back core 21 in contrast to the EXAMPLE 3-I.

A projection 39c is formed on the end of the transverse section 33 on the side which does not make contact with the longitudinal section 32. The projection 39c extends towards the back core 21. The longitudinal section 32 is in close contact with the side face of the teeth 11. The projection 39c forms a space 34b between the back core 21 and the insulating side plate 27. This space 34b comprises the cooling passage 36. The range of windings of the stator coils 14 extends from the transverse section 33 on the insulating side plate 27 to the tip of the teeth 11. Thus it is possible to use a simple structure in order to form a cooling passage 36 for directly cooling the stator core 5 with the cooling liquid.

EXAMPLE 3-III

FIG. 26A–FIG. 26C show the structure of EXAMPLE 3-III of the second cooling passage. In EXAMPLE 3-III, the cooling passage 37 for the stator is formed both between the longitudinal section 32 and the teeth 11 and between the transverse section 33 of the insulating side plate 27 and the back core 21.

Projections 39a, 39c are formed towards the stator core 5 on the ends at which the longitudinal section 32 and the transverse section 33 do not make contact with each other. In this manner, a space 34c is formed along the longitudinal section 32 and the transverse section 33. The space 34c is used as a cooling passage 37. The cooling efficiency is improved since the area of contact of the cooling liquid with the stator core 5 is greater than EXAMPLE 3-I or EXAMPLE 3-II.

EXAMPLE 3-IV

Figure 27A:
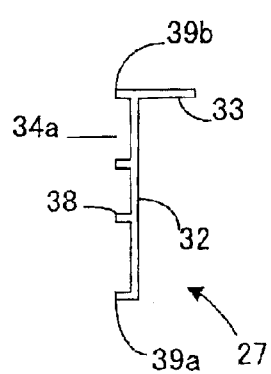
FIG. 27A is an end view of the insulating side plate and FIG. 27B is a side view of the insulating side plate.
Figure 27B:
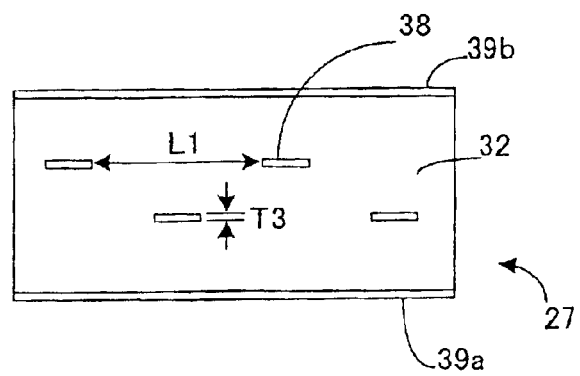

FIG. 27A–FIG. 27C show the structure of EXAMPLE 3-IV of the second cooling passage. In EXAMPLE 3-IV, a plurality of projections 38 are formed at a fixed interval on the face of the longitudinal section 32 facing the side face of the teeth 11. The height of the projections 38 is the same as the projections 39a, 39b. The plurality of projections 38 is disposed in series and adjacent projections 38 in the series are separated by an interval L1. When the insulating side plate 27 is mounted on the stator core 5, the direction of the series substantially corresponds with the axis of the stator core 5. The projections 38 in each series deviate with respect to the direction of the series only by half the length of the interval L1. Furthermore the thickness T3 of the projections 38 is smaller than half of the width W1 of the insulating side plate 27. In this manner, the projections 38 do not impede the flow of cooling liquid between the side face of the teeth 11 and the insulating side plate 27 with respect to the axial direction of the stator core 5.

The projections 38 prevent the interval between the insulating side plate 27 and the stator coil 14 from being crushed when the stator coils 14 are wound around the teeth 11. The projections 38 are oriented in an axial direction in a zigzag pattern without coming into contact with one another. Consequently the flow of cooling liquid is not largely impeded and the cooling liquid can cool the stator core 5 directly.

EXAMPLE 3-V

Figure 28A:
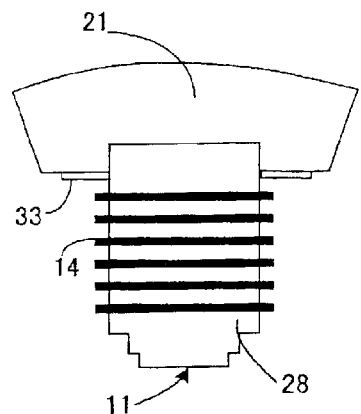
FIG. 28A is an end view.
Figure 28B:
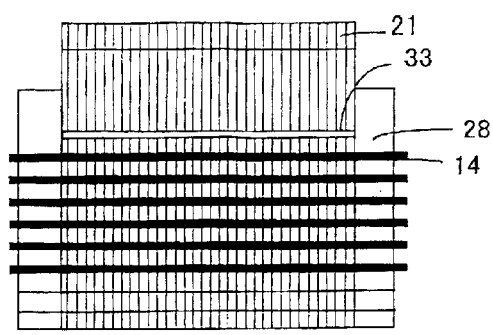
FIG. 28B is a side view.
Figure 28C:
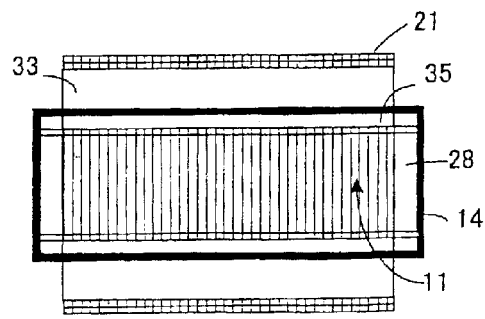
FIG. 28C is a front view.

FIG. 28A–FIG. 28C show the structure of EXAMPLE 3-V of the second cooling passage. Referring to FIG. 28A–FIG. 28C, an insulating end plate 28, which covers the end face of the teeth 11, is provided on both ends of the stator core 5. The width of the insulating end plate 28 is greater than width of the teeth 11 with respect to a circumferential direction of the stare core 5. Thus, after winding the stator coils 14, the interval between the teeth 11 and the stator coils 14 can be used as a cooling passage 35 without providing the insulating side plate 27. In this manner, it is possible to facilitate cooling of the stator core 5 by placing the cooling liquid in direct contact with the stator core 5. In FIG. 28A–FIG. 28C, although the wire in the stator coils 14 is shown with an interval therebetween for the purposes of description, it should be noted that in reality there is almost no space between the wire in the coils. The winding pressure from the stator coils 14 can be supported by the insulating end plate 28 on both ends of the teeth 11. Thus it is possible to form a cooling passage 35 using only the transverse section 33 and the insulating end plate 28 without making use of the longitudinal section 32 of the insulating side plate 27.

EXAMPLE 3-VI

Figure 29A:
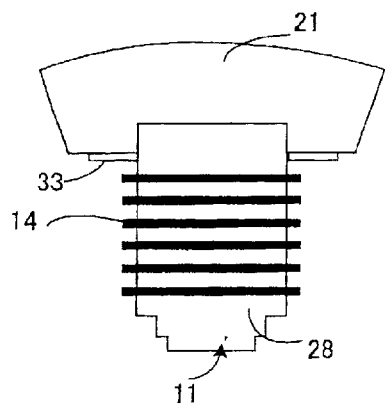
FIG. 29A is an end view.
Figure 29B:
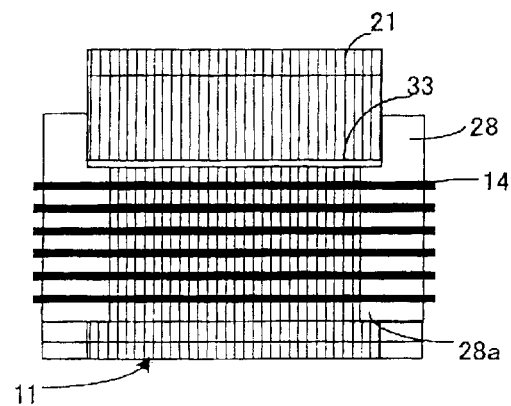
FIG. 29B is a side view.
Figure 29C:
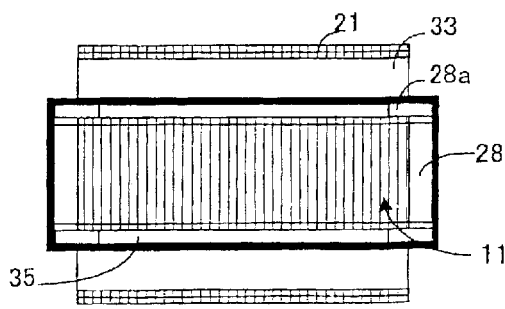
FIG. 29C is a front view.

FIG. 29A–FIG. 29C show the structure of EXAMPLE 3-VI of the second cooling passage. In EXAMPLE 3-VI of the cooling passage, both ends of the insulating end plate 28 are bent into a right angle. The insulating end plate 28 is provided with bend sections 28a coming into contact with the side face of the teeth 11. As shown in FIG. 29C, the insulating end plate 28 is in the shape of a saddle and is adapted to engage with the end of the teeth 11 of the stator core 5. Thus the insulating end plate 28 is fixed to the stator core 5. The insulating end plate 28 maintains the shape of the cooling passage 35 provided between the stator coils 14 and the stator core 5. Consequently flow of the cooling liquid is ensured between the stator core 5 and the stator coil 14.

EXAMPLE 3-VII

Figure 30A:
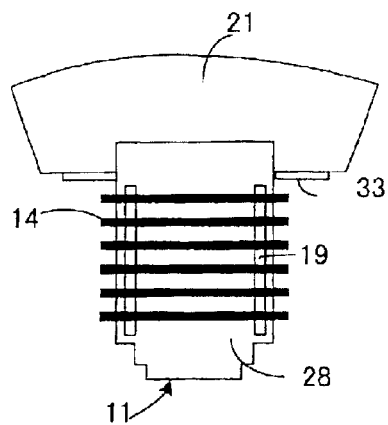
FIG. 30A is an end view.
Figure 30B:
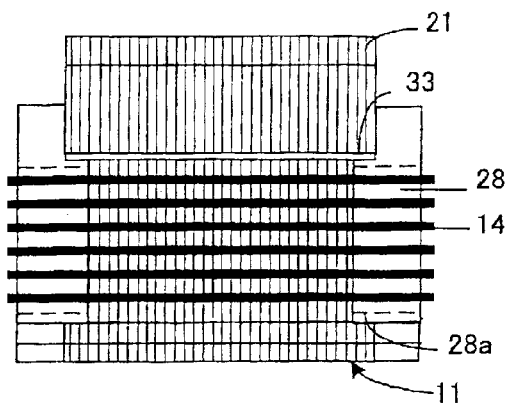
FIG. 30B is a side view.
Figure 30C:
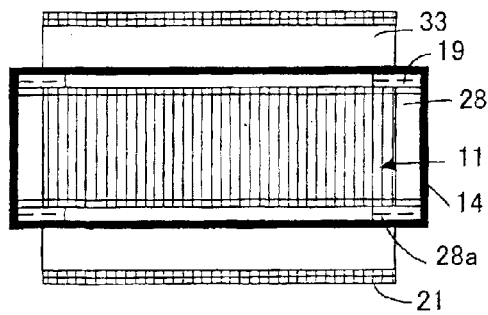
FIG. 30C is a front view.

FIG. 30A–FIG. 30C show the structure of an EXAMPLE 3-VII for the second cooling passage. In the EXAMPLE 3-VII for the cooling passage, a pair of cooling holes 19 is provided to allow flow of cooling liquid in the space between the stator core 5 and the stator coils 14. The holes 19 are provided in the insulating end plate 28 of EXAMPLE 3-VI. The cooling holes 19 are connected to the cooling passage 35 and are formed on both ends of the insulating end plate 28 in a longitudinal direction in order to facilitate flow between the stator core 5 and the stator coils 14. In this manner, it is possible to adapt the holes 19 for use as an inlet or outlet for cooling liquid. The cooling performance of the stator core 5 is improved due to the fact that the cooling liquid tends to flow in the stator cooling passage 35.

EXAMPLE 3-VIII

Figure 31A:
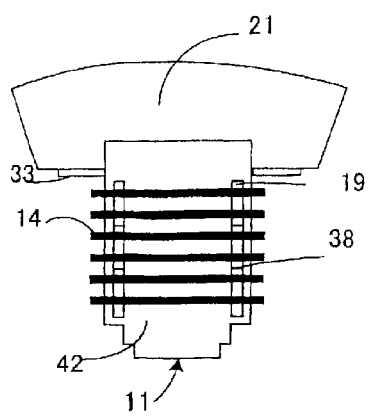
FIG. 31A is an end view.
Figure 31B:
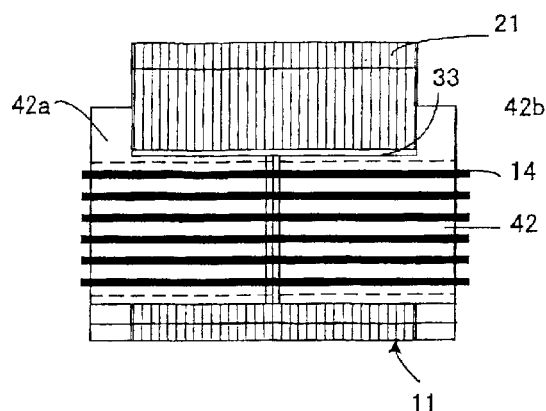
FIG. 31B is a side view.
Figure 31C:
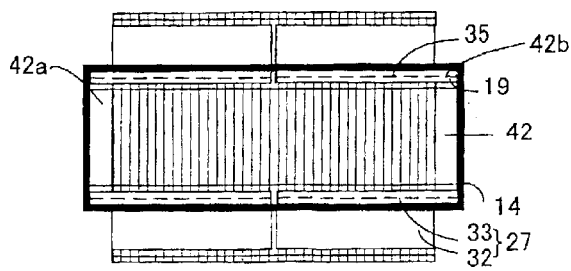
FIG. 31C is a front view.

FIG. 31A–FIG. 31C show the structure of an EXAMPLE 3-VIII for the second cooling passage. EXAMPLE 3-VIII for the cooling passage is formed by two insulating plates 42a, 42b combining the characteristics of the insulating end plate 28 shown in FIG. 29 and the insulating side plate 27 shown in FIG. 27. That is to say, the insulating end plate 42 has a structure in which the projection makes contact with the side face of the teeth 11. The width of the insulating end plate 42 is greater in a circumferential direction of the stator core 5 than that of the teeth 11. Furthermore the insulating end plate 42 is fitted to the teeth 11 of the stator core 5. In this manner, positioning of the insulating side plate 42 is facilitated and the stator core 5 is cooled by direct contact with the cooling liquid.

The entire contents of Japanese Patent Applications P2001-307128 (filed Oct. 3, 2001), P2001-316292 (filed Oct. 15, 2001), and P2001-312258 (filed Oct. 10, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A rotating electric machine comprising:
   a rotor;
   a substantially cylindrical stator core having teeth and a back core from which the teeth project;
   stator coils wound on the periphery of the teeth of the stator core;
   a slot formed between two adjacent teeth;
   a first cooling medium passage extending along an axial direction of the stator core, the first cooling medium passage formed in the slot and between two adjacent stator coils by sealing the slot opening facing the rotor; and
   a second cooling medium passage extending in parallel to the first cooling medium passage, the first and second cooling medium passage allowing flow of cooling medium;
   wherein the stator core forms at least a section of the passage wall of the second cooling medium passage;
   wherein the stator core includes a straight line in an axial direction on the surface of the slot such that the distance from the straight line to the cylindrical outer peripheral face of the stator core is equal to a minimum width Wmin of the back core;
   wherein the teeth comprise tips facing the rotor and rectangular parallelepiped trunks provided between the tip and the back core, the stator coils being wound around the trunks;
   wherein the second cooling medium passage is disposed in the back core between a first plane which extends along a radial direction of the stator core and includes the straight line on the surface of the slot and a second plane including a side face of the trunk of the teeth; and
   wherein the distance in a radial direction between the outer peripheral face and the surface of the second cooling medium passage is greater than or equal to the minimum width Wmin.

2. The rotating electric machine as defined by claim 1, wherein the second cooling medium passage is disposed in a vicinity of the stator coils.

3. The rotating electric machine as defined by claim 2, wherein the second cooling medium passage comprises a plurality of holes.

4. The rotating electric machine as defined by claim 1, wherein the second cooling medium passage comprises a hole provided through the back core and the entire wall of the hole is included in the back core.

5. The rotating electric machine as defined by claim 1, wherein the second cooling medium passage opens into the slot and comprises a plurality of grooves extending in an axial direction of the stator core.

6. The rotating electric machine as defined by claim 1, wherein the first plane is a central plane of the slot.

7. The rotating electric machine as defined by claim 1, wherein the second cooling medium passage has a semi-cylindrical shape with an opening of a convex shape, and a central section of the cooling medium passage dilates towards the outer peripheral face of the stator core.

8. The rotating electric machine as defined by claim 1 further comprising a case for housing the stator core; a cylindrical section projecting from both end faces of the stator core and along an inner face of the stator core; and a cooling jacket defined by the case, the cylindrical section and both end faces of the stator core.

9. The rotating electric machine as defined by claim 1, wherein the coils are wound in concentrated windings on the teeth.

10. The rotating electric machine as defined by claim 1, wherein the second cooling medium passage is disposed so that the second cooling medium passage does not largely impede the flow of magnetic flux in the stator core.

11. A rotating electric machine comprising:
    a rotor;
    a substantially cylindrical stator core having teeth and a back core from which the teeth project;
    stator coils wound on the periphery of the teeth of the stator core;
    a slot formed between two adjacent teeth;
    a first cooling medium passage extending alone an axial direction of the stator core, the first cooling medium passage formed in the slot and between two adjacent stator coils by sealing the slot opening facing the rotor; and
    a second cooling medium passage extending in parallel to the first cooling medium passage, the first and second cooling medium passage allowing flow of cooling medium;
    wherein the stator core forms at least a section of the passage wall of the second cooling medium passage, wherein each tooth comprises a trunk covered by the stator coil and connected to a tip facing the rotor, wherein the tip is not covered by the stator coil, and wherein the second cooling medium passage is provided through the tip of the teeth along an axial direction of the stator core.

12. The rotating electric machine as defined by claim 11 further comprising a case for housing the stator core; a cylindrical section projecting from an end face of the stator core connected with an inner face of the stator core; a cooling jacket defined by the case, the cylindrical section and the end face of the stator core; wherein the second cooling medium passage is formed on an outer peripheral side of positions at which the cylindrical section makes contact with the teeth of the stator core.

13. The rotating electric machine as defined by claim 11, wherein a plurality of second cooling medium passages is provided to each tooth along a circumferential direction of the stator core.

14. The rotating electric machine as defined by claim 11, wherein the second cooling medium passage is enlarged towards the trunk of the tooth covered by the stator coil.

15. The rotating electric machine as defined by claim 14 comprising an insulating body covering an end face of the tooth and sandwiched by the stator coil and the end face of the tooth; the insulating body having a notch preventing the insulating body from covering an opening of the second cooling medium passage.

16. The rotating electric machine as defined by claim 11 further comprising an insulating body covering both end faces of the tooth; a case for housing the stator core; a cylindrical section projecting from the insulating body connected with an inner face of the stator core; and a cooling jacket defined by the case, the cylindrical section and the end faces of the stator core;
  wherein the insulating body is sandwiched by the tooth and the stator coil; the insulating body is provided with an opening on the outer peripheral side of the cylindrical section; and the second cooling passage is connected to the opening of the insulating body.

17. The rotating electric machine as defined by claim 11, wherein a cross section of the second cooling medium passage takes a shape in which the dimension in a radial direction of the stator core is larger than the dimension perpendicular to the radial direction.

18. The rotating electric machine as defined by claim 11, wherein a cross-sectional shape of the second cooling medium passage is in substantially the shape of a rhombus in which the dimension in a radial direction of the stator core is larger than the dimension perpendicular to the radial direction.

19. The rotating electric machine as defined by claim 11, wherein a cross sectional shape of the second cooling medium passage is in substantially the shape of a triangle in which the height with respect to a radial direction of the stator core is larger than the bottom edge perpendicular to the radial direction.

20. The rotating electric machine as defined by claim 11, wherein the second cooling medium passage is disposed so that the second cooling medium passage does not largely impede the flow of magnetic flux in the stator core.

21. The rotating electric machine as defined by claim 11, wherein a cross sectional shape of the second cooling medium passage is in substantially the shape of a tear drop in which the height with respect to a radial direction of the stator core is larger than the greatest width when measured perpendicular to the radial direction.

22. A rotating electric machine comprising:
  a rotor;
  a substantially cylindrical stator core having teeth and a back core from which the teeth project;
  stator coils wound on the periphery of the teeth of the stator core;
  a slot formed between two adjacent teeth;
  a first cooling medium passage extending along an axial direction of the stator core, the first cooling medium passage formed in the slot and between two adjacent stator coils by sealing the slot opening facing the rotor; and
  a second cooling medium passage extending in parallel to the first cooling medium passage, the first and second cooling medium passage allowing flow of cooling medium; and
  an insulating body disposed on a face of the stator core;
  wherein the stator core forms at least a section of the passage wall of the second cooling medium passage; and
  wherein the second cooling medium passage is formed between the stator core and the insulating body.

23. The rotating electric machine as defined by claim 22, wherein the insulating body includes an insulating body side plate disposed in parallel to a side face of the tooth and extending along the axial direction of the stator core; the second cooling medium passage being provided between the side face of the tooth and the insulating body side plate.

24. The rotating electric machine as defined by claim 23, wherein the insulating body side plate is provided with a plurality of projections making contact with the side face of the tooth.

25. The rotating electric machine as defined by claim 23, wherein the insulating body further comprises an insulating body end plate disposed on an end face of the tooth; each coil is wound in a concentrated winding about the insulating body end plate and the insulating body side plate; and the length of the coil with respect to a radial direction of the stator core is smaller than the length of the insulating body end plate in the radial direction.

26. The rotating electric machine as defined by claim 25, wherein the insulating body side plate and the insulating body end plate are integrated.

27. The rotating electric machine as defined by claim 22, wherein the second cooling medium passage is disposed so that the second cooling medium passage does not largely impede the flow of magnetic flux in the stator core.

28. A rotating electric machine comprising:
  a rotor;
  a substantially cylindrical stator core having teeth and a back core from which the teeth project;
  stator coils wound on the periphery of the teeth of the stator core;
  a slot formed between two adjacent teeth;
  a first cooling medium passage extending along an axial direction of the stator core, the first cooling medium passage formed in the slot and between two adjacent stator coils by sealing the slot opening facing the rotor; and
  a second cooling medium passage extending in parallel to the first cooling medium passage, the first and second cooling medium passage allowing flow of cooling medium; and
  an insulating body provided with the coil wound thereabout, the insulating body being sandwiched between the coil and the tooth;
  wherein the stator core forms at least a section of the passage wall of the second cooling medium passage; and
  wherein the insulating body is disposed on the periphery of the tooth of the stator core so as to create a space between the coil and the stator core; the space comprising the second cooling medium passage.

29. The rotating electric machine as defined by claim 28, wherein the insulating body is provided with an insulating body end plate disposed on an end face of the tooth; and the width of the insulating body end plate is greater than the width of the tooth.

30. The rotating electric machine as defined by claim 29, wherein the insulating body end plate is formed as an indentation, with bent sections on both sides, and is engaged with the end face of the tooth.

31. The rotating electric machine as defined by claim 29, wherein an opening connected to the space formed between the stator core and the coil is provided in the insulating body end plate and the opening is connected to the second cooling medium passage.

32. The rotating electric machine as defined by claim 28, wherein the second cooling medium passage is disposed so that the second cooling medium passage does not largely impede the flow of magnetic flux in the stator core.

* * * * *